(12) United States Patent
Ren et al.

(10) Patent No.: US 12,542,637 B2
(45) Date of Patent: Feb. 3, 2026

(54) DOWNLINK POSITIONING REFERENCE SIGNAL RECEIVING AND TRANSMITTING METHOD, AND TERMINAL, BASE STATION, DEVICE AND APPARATUS

(71) Applicant: DATANG MOBILE COMMUNICATIONS EQUIPMENT CO., LTD., Beijing (CN)

(72) Inventors: Bin Ren, Beijing (CN); Xiaotao Ren, Beijing (CN); Ren Da, Beijing (CN); Zheng Zhao, Beijing (CN); Gang Li, Beijing (CN); Hui Li, Beijing (CN); Rongyi Fang, Beijing (CN); Zhenyu Zhang, Beijing (CN); Xuejuan Gao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 381 days.

(21) Appl. No.: 18/019,953

(22) PCT Filed: May 13, 2021

(86) PCT No.: PCT/CN2021/093669
§ 371 (c)(1),
(2) Date: Feb. 6, 2023

(87) PCT Pub. No.: WO2022/028032
PCT Pub. Date: Feb. 10, 2022

(65) Prior Publication Data
US 2023/0299917 A1 Sep. 21, 2023

(30) Foreign Application Priority Data
Aug. 7, 2020 (CN) .......................... 202010788553.3

(51) Int. Cl.
*H04W 4/00* (2018.01)
*G01S 5/14* (2006.01)
(Continued)

(52) U.S. Cl.
CPC .............. *H04L 5/0051* (2013.01); *G01S 5/14* (2013.01); *H04W 24/08* (2013.01)

(58) Field of Classification Search
CPC ....... H04L 5/0051; H04L 5/0048; G01S 5/14; G01S 5/0036; G01S 5/0205; H04W 24/08;
(Continued)

(56) References Cited

U.S. PATENT DOCUMENTS 9,277,523 B2* 3/2016 Sampath ............... H04W 4/025
9,462,448 B2* 10/2016 Edge ........................ G01S 1/20
(Continued)

FOREIGN PATENT DOCUMENTS

CN 104540099 A 4/2015
CN 107360617 A 11/2017
(Continued)

OTHER PUBLICATIONS

CMCC, "Discussion on DL PRS design," 3GPP TSG RAN WG1 #99, R1-1912548, Reno, USA, Nov. 18-22, 2019.
(Continued)

*Primary Examiner* — Stephen M D Agosta
(74) *Attorney, Agent, or Firm* — Meunier Carlin & Curfman LLC

(57) ABSTRACT

Disclosed are a downlink positioning reference signal receiving and transmitting method, and a terminal, a base station, a device and an apparatus. The method includes: in response to receiving SPS DL-PRS configuration information of a plurality of base stations configured by a LMF via SPS, receiving SPS DL-PRS activation information of the
(Continued)

plurality of base stations; where the plurality of base stations comprise a serving base station and a non-serving base station; receiving and measuring an SPS DL-PRS according to a period and time-frequency resource information of the SPS DL-PRS determined from the SPS DL-PRS configuration information and according to a downlink slot of the SPS DL-PRS determined from the SPS DL-PRS activation information, and obtaining a positioning measurement; and sending the positioning measurement to the LMF or the serving base station of the UE.

18 Claims, 14 Drawing Sheets

(51) Int. Cl.
*H04L 5/00* (2006.01)
*H04W 24/08* (2009.01)

(58) Field of Classification Search
CPC . H04W 64/00; H04W 72/11; H04W 28/0226; H04W 24/02; H04W 28/0236; H04W 28/06; H04W 72/51
See application file for complete search history.

(56) References Cited

U.S. PATENT DOCUMENTS

| | | | | |
|---|---|---|---|---|
| 9,668,099 | B2 * | 5/2017 | Davydov | H04W 4/021 |
| 9,961,660 | B2 * | 5/2018 | Harris | H04W 52/0206 |
| 10,045,325 | B2 * | 8/2018 | Yoon | H04W 64/003 |
| 10,218,471 | B1 * | 2/2019 | Kumar | H04L 27/0012 |
| 10,317,509 | B2 * | 6/2019 | Fischer | H04L 5/0048 |
| 10,349,371 | B2 * | 7/2019 | Park | H04W 64/00 |
| 10,630,410 | B2 * | 4/2020 | Parkvall | H04L 65/1023 |
| 10,660,109 | B2 * | 5/2020 | Bitra | H04L 5/0091 |
| 10,798,672 | B2 * | 10/2020 | Cui | H04W 24/10 |
| 11,012,966 | B2 * | 5/2021 | Cui | H04W 64/00 |
| 11,013,010 | B2 * | 5/2021 | Rico Alvarino | H04W 72/51 |
| 11,129,195 | B2 * | 9/2021 | Rico Alvarino | H04L 5/0048 |
| 11,201,715 | B2 * | 12/2021 | Da | H04W 24/08 |
| 11,570,577 | B2 * | 1/2023 | Wong | G01S 5/14 |
| 11,576,008 | B2 * | 2/2023 | Priyanto | H04L 5/0048 |
| 11,726,163 | B2 * | 8/2023 | Xiong | H04B 1/713 455/456.1 |
| 11,777,676 | B2 * | 10/2023 | Da | H04W 4/02 370/330 |
| 11,796,625 | B2 * | 10/2023 | Dwivedi | H04W 72/0453 |
| 12,177,145 | B2 * | 12/2024 | Duan | H04W 72/21 |
| 12,261,788 | B2 * | 3/2025 | Shreevastav | G01S 1/0428 |
| 2014/0162704 | A1 * | 6/2014 | Choi | H04W 64/00 455/456.6 |
| 2015/0223185 | A1 * | 8/2015 | Harris | H04W 52/0206 455/456.5 |
| 2015/0296359 | A1 * | 10/2015 | Edge | G01S 1/0428 455/404.2 |
| 2016/0037301 | A1 * | 2/2016 | Davydov | H04W 4/90 455/456.1 |
| 2016/0195601 | A1 * | 7/2016 | Siomina | G01S 5/10 455/456.1 |
| 2017/0026799 | A1 * | 1/2017 | Sampath | H04W 4/02 |
| 2017/0111880 | A1 | 4/2017 | Park et al. | |
| 2017/0285132 | A1 * | 10/2017 | Fischer | H04W 72/12 |
| 2017/0288830 | A1 * | 10/2017 | Fischer | H04W 72/23 |
| 2017/0331577 | A1 * | 11/2017 | Parkvall | H04W 8/18 |
| 2018/0007708 | A1 * | 1/2018 | Ke | H04W 24/00 |
| 2018/0049151 | A1 * | 2/2018 | Yoon | H04L 5/005 |
| 2018/0139763 | A1 * | 5/2018 | Bitra | H04W 72/542 |
| 2019/0037338 | A1 * | 1/2019 | Edge | H04W 4/02 |
| 2019/0052432 | A1 * | 2/2019 | Islam | H04L 5/0053 |
| 2019/0162817 | A1 * | 5/2019 | Priyanto | G01S 5/0236 |
| 2019/0166452 | A1 * | 5/2019 | Tenny | G01S 5/14 |
| 2019/0174454 | A1 * | 6/2019 | Priyanto | G01S 5/0036 |
| 2019/0239181 | A1 * | 8/2019 | Gangakhedkar | H04W 76/10 |
| 2020/0021946 | A1 * | 1/2020 | Kumar | G01S 1/0428 |
| 2020/0028550 | A1 * | 1/2020 | Manolakos | H04L 5/0023 |
| 2020/0028648 | A1 | 1/2020 | Akkarakaran et al. | |
| 2020/0107286 | A1 | 4/2020 | Akkarakaran et al. | |
| 2021/0076348 | A1 * | 3/2021 | Yoon | H04W 4/02 |
| 2021/0120519 | A1 * | 4/2021 | Si | H04W 72/30 |
| 2021/0126726 | A1 * | 4/2021 | Parkvall | H04W 8/18 |
| 2021/0219104 | A1 * | 7/2021 | Chen | H04L 5/0048 |
| 2021/0266773 | A1 * | 8/2021 | Lee | H04W 64/00 |
| 2021/0282106 | A1 * | 9/2021 | Xiong | H04W 64/00 |
| 2021/0282111 | A1 * | 9/2021 | Yamada | H04L 5/0051 |
| 2022/0039057 | A1 * | 2/2022 | Bao | H04W 8/08 |
| 2022/0123879 | A1 * | 4/2022 | Munier | H04W 64/00 |
| 2023/0198699 | A1 * | 6/2023 | Wang | H04L 5/0048 370/329 |
| 2025/0119865 | A1 * | 4/2025 | Sahin | H04W 64/00 |

FOREIGN PATENT DOCUMENTS

| | | |
|---|---|---|
| CN | 110062457 A | 7/2019 |
| CN | 111356075 A | 6/2020 |
| CN | 111448834 A | 7/2020 |
| TW | 202131710 A | 8/2021 |
| WO | 2015160705 A1 | 10/2015 |

OTHER PUBLICATIONS

CATT, "Discussion of NR positioning enhancements," 3GPP TSG RAN WG1 Meeting #101, R1-2003642, e-meeting, May 25-Jun. 5, 2020.

Huawei et al, "Remaining issues on DL PRS for NR positioning" 3GPP TSG RAN WG1 Meeting #99 R1 1911896, Nov. 22, 2019.

* cited by examiner

DOWNLINK POSITIONING REFERENCE SIGNAL RECEIVING AND TRANSMITTING METHOD, AND TERMINAL, BASE STATION, DEVICE AND APPARATUS

CROSS-REFERENCE OF RELATED APPLICATIONS

The application is a national phase entry under 35 U.S.C. § 371 of International Application No. PCT/CN2021/093669, filed on May 13, 2021, which claims the priority from Chinese Patent Application No. 202010788553.3, filed with the Chinese Patent Office on Aug. 7, 2020 and entitled "Method for Receiving and Sending Downlink Positioning Reference Signal, and Terminal, Base Station, Device and Apparatus", which is hereby incorporated by reference in its entirety.

TECHNICAL FIELD

The application relates to the field of wireless communication technologies, and in particular to a method for receiving and sending a downlink positioning reference signal, and a terminal, a base station, a device and an apparatus.

BACKGROUND

In downlink positioning, the DownLink Positioning Reference Signal (DL-PRS) is an important positioning reference signal, and the DL-PRS may be configured to occupy different bandwidths and time-domain resources and may also be sent in different beam directions.

The DL-PRS is a cell-specific reference signal, and only the periodic DL-PRS is defined in the second version Rel-16 of the 5G specification. However, once the periodic DL-PRS is configured, the base station will send it periodically. Even when the UE no longer needs the positioning service, the base station will also continue to send the periodic DL-PRS, so that the overhead of time-frequency resources is relatively large, resulting in a waste of resource; and furthermore, the positioning delay of the periodic DL-PRS is relatively large.

SUMMARY

Embodiments of the application provide a method for receiving and sending a downlink positioning reference signal, and a terminal, a base station, a device and an apparatus, so as to reduce the positioning delay and the overhead of the downlink positioning reference signal, and improve the system spectrum efficiency.

In a first aspect, an embodiment of the application provides a method for receiving a downlink positioning reference signal, including:
  receiving, by a User Equipment (UE), Semi-Persistent Scheduling (SPS) DL-PRS activation information of a plurality of base stations after receiving SPS DL-PRS configuration information of the plurality of base stations configured by a Location Management Function (LMF) through SPS; where the base stations include a serving base station and a non-serving base station;
  receiving and measuring, by the UE, an SPS DL-PRS according to a period and time-frequency resource information of the SPS DL-PRS determined from the SPS DL-PRS configuration information and according to a downlink slot of the SPS DL-PRS determined from the SPS DL-PRS activation information, and obtaining a positioning measurement;
  sending, by the UE, the positioning measurement to the LMF or the serving base station of the UE, to notify a base station corresponding to the SPS DL-PRS activation information to stop sending the SPS DL-PRS.

The method provided in this embodiment can activate the SPS DL-PRS of the serving base station and the non-serving base station (the base station adjacent to the serving base station), so that the terminal positioning process can be completed with the relatively small overhead of the downlink positioning reference signal, reducing the positioning delay and the overhead of the downlink positioning reference signal, and improve the system spectrum efficiency.

As an optional embodiment, after the UE sends the positioning measurement to the LMF or the serving base station of the UE, the method further includes:
  stopping, by the UE, receiving the SPS DL-PRS; or
  stopping, by the UE, receiving an SPS DL-PRS corresponding to SPS DL-PRS deactivation information of at least one base station in response to receiving the SPS DL-PRS deactivation information.

The method provided in this embodiment of the application can also enable the UE to stop receiving the SPS DL-PRS, improving the current problem that the periodic DL-PRS is regularly sent so that the UE may still receive the DL-PRS for positioning measurement even when the positioning service is no longer needed.

As an optional embodiment, after the UE obtains the positioning measurement, the method further includes:
  sending, by the UE, SPS DL-PRS deactivation information of at least one base station, to notify the base station corresponding to the SPS DL-PRS deactivation information to stop sending the SPS DL-PRS.

The method provided in this embodiment of the application can also enable the base station to stop sending the SPS DL-PRS after receiving the SPS DL-PRS deactivation information, thus reducing the overhead of the positioning reference signal effectively.

As an optional embodiment, after the UE sends the positioning measurement to the LMF, the method further includes:
  sending, by the UE, the positioning measurement to the base station corresponding to the SPS DL-PRS activation information through the LMF; or
  sending, by the UE, the positioning measurement to the serving base station, includes:
  sending, by the UE, the positioning measurement to the serving base station, so that the serving base station stops sending the SPS DL-PRS based on the positioning measurement and notifies the non-serving base station to stop sending the SPS DL-PRS.

This embodiment of the application provides two ways to send the positioning measurement, the purpose of which is to notify the base station to stop sending the SPS DL-PRS through the LMF, or notify the serving base station to stop sending the SPS DL-PRS, and the serving base station notifies the non-serving base station to stop sending the SPS DL-PRS, thus reducing the overhead of positioning reference signals effectively.

As an optional embodiment, before the UE receives the SPS DL-PRS configuration information of the base stations from the LMF by the SPS configuration, the method further includes:
  sending, by the UE, a positioning Quality of Service (QoS) indicator of the UE to the LMF, to notify the LMF to determine the SPS DL-PRS configuration information corresponding to the positioning QoS indicator according to the positioning QoS indicator.

The SPS DL-PRS configuration information provided in this embodiment of the application is determined based on the positioning QoS indicator, and different SPS DL-PRS configuration information is determined for the positioning QoS indicators of different UEs, so as to provide different UEs with the SPS DL-PRS configuration information more accurately, thereby ensuring the accuracy of UE positioning.

As an optional embodiment, receiving, by the UE, the SPS DL-PRS configuration information of the plurality of base stations from the LMF by the SPS configuration, includes:

receiving, by the UE, the SPS DL-PRS configuration information of the plurality of base stations from the LMF by the SPS configuration via Location Protocol (LPP) signaling or Radio Resource Control (RRC) signaling; and/or receiving, by the UE, the SPS DL-PRS activation information of the plurality of base stations, includes:

receiving, by the UE, the SPS DL-PRS activation information of the plurality of base stations through Downlink Control Information (DCI) signaling or Media Access Control-Control Element (MAC-CE) signaling.

In this embodiment of the application, the signalings used to transmit the SPS DL-PRS configuration information and the SPS DL-PRS activation information are different, which can effectively ensure the efficiency and accuracy of transmission.

As an optional embodiment, receiving, by the UE, the SPS DL-PRS activation information of the plurality of base stations, includes:

determining, by the UE, activation information according to an activation field in the DCI signaling after determining that the activation information is the SPS DL-PRS activation information according to a newly added field in the received DCI signaling.

The method for determining the SPS DL-PRS activation information provided in this embodiment of the application may be to determine according to the newly added field based on the existing SPS activation field, which can effectively save transmission resources.

As an optional embodiment, the SPS DL-PRS activation information includes: first SPS DL-PRS activation information of the serving base station and second SPS DL-PRS activation information of the non-serving base station;

receiving, by the UE, the SPS DL-PRS activation information of the plurality of base stations, includes:

determining, by the UE, the first SPS DL-PRS activation information according to a first field in a received signaling and the second SPS DL-PRS activation information according to a second field in the signaling; or determining, by the UE, the first SPS DL-PRS activation information through a field in a received first signaling after determining the corresponding serving base station according to an index indication field in the first signaling; and determining, by the UE, the second SPS DL-PRS activation information through a field in a received second signaling after determining the corresponding non-serving base station according to an index indication field in the second signaling.

In this embodiment of the application, the SPS DL-PRS activation information can also be determined through the newly defined field, so that more information can be carried, facilitating more information to be carried in the activation information later, and improving the positioning accuracy.

In a second aspect, an embodiment of the application provides a first method for sending a downlink positioning reference signal, including:

determining, by a serving base station, SPS DL-PRS activation information of a plurality of base stations including the serving base station and a non-serving base station after receiving SPS DL-PRS configuration information of the serving base station configured by an LMF through SPS;

sending, by the serving base station, the SPS DL-PRS activation information of the plurality of base stations to a UE, and sending an SPS DL-PRS to the UE according to a period of the SPS DL-PRS determined from the SPS DL-PRS configuration information of the serving base station and a downlink slot of the SPS DL-PRS determined from SPS DL-PRS activation information of the serving base station;

stopping, by the serving base station, sending the SPS DL-PRS in response to receiving a positioning measurement or SPS DL-PRS deactivation information of the serving base station.

As an optional embodiment, the SPS DL-PRS activation information includes: first SPS DL-PRS activation information of the serving base station and second SPS DL-PRS activation information of the non-serving base station;

determining, by the serving base station, the SPS DL-PRS activation information of the plurality of base stations including the serving base station and the non-serving base station, includes:

receiving, by the serving base station, the first SPS DL-PRS activation information through the LMF, or determining the first SPS DL-PRS activation information by itself;

receiving, by the serving base station, the second SPS DL-PRS activation information through the LMF or an Xn interface between base stations.

As an optional embodiment, receiving, by the serving base station, the SPS DL-PRS configuration information of the serving base station from the LMF by the SPS configuration, includes:

receiving, by the serving base station, the SPS DL-PRS configuration information of the serving base station from the LMF by the SPS configuration via LLP signaling or RRC signaling; and/or sending, by the serving base station, the SPS DL-PRS activation information of the plurality of base stations to the UE, includes:

sending, by the serving base station, the SPS DL-PRS activation information of the plurality of base stations through DCI signaling or MAC-CE signaling.

As an optional embodiment, sending, by the serving base station, the SPS DL-PRS activation information of the plurality of base stations to the UE, includes:

determining, by the serving base station, activation information according to an activation field in the DCI signaling after determining that the activation information is the SPS DL-PRS activation information according to a newly added field in the sent DCI signaling.

As an optional embodiment, the SPS DL-PRS activation information includes: first SPS DL-PRS activation information of the serving base station and second SPS DL-PRS activation information of the non-serving base station;

sending, by the serving base station, the SPS DL-PRS activation information of the plurality of base stations to the UE, includes:

determining, by the serving base station, the first SPS DL-PRS activation information according to a first field in a sent signaling and the second SPS DL-PRS activation information according to a second field in the signaling; or determining, by the serving base station, the first SPS DL-PRS activation information through a field in a sent first signaling after determining the corresponding serving base station according to an index indication field in the first signaling; and determining, by the serving base station, the second SPS DL-PRS activation information through a field in a sent second signaling after determining the corresponding non-serving base station according to an index indication field in the second signaling.

As an optional embodiment, the method further includes:
notifying, by the serving base station, the non-serving base station to stop sending an SPS DL-PRS, or sending, by the serving base station, SPS DL-PRS deactivation information of the non-serving base station to the UE, after receiving the SPS DL-PRS deactivation information of the non-serving base station.

As an optional embodiment, after the serving base station receives the positioning measurement or the SPS DL-PRS deactivation information of the serving base station, the method further includes:
sending, by the serving base station, the SPS DL-PRS deactivation information of the serving base station to the UE.

As an optional embodiment, sending, by the serving base station, the SPS DL-PRS deactivation information of the non-serving base station to the UE, includes:
sending, by the serving base station, the SPS DL-PRS deactivation information of the non-serving base station to the UE through DCI signaling or MAC CE signaling; and/or
sending, by the serving base station, the SPS DL-PRS deactivation information of the serving base station to the UE, includes:
sending, by the serving base station, the SPS DL-PRS deactivation information of the serving base station to the UE through DCI signaling or MAC CE signaling.

In a third aspect, an embodiment of the application provides a second method for sending a downlink positioning reference signal, including:
determining, by an LMF, SPS DL-PRS configuration information of a UE configured through SPS, and sending the SPS DL-PRS configuration information to the UE and a plurality of base stations including a serving base station and a non-serving base station of the UE, after receiving a positioning request sent by the UE;
if the LMF receives a positioning measurement of the UE:
sending SPS DL-PRS deactivation information to the UE, to notify the UE to stop receiving an SPS DL-PRS according to a period and time-frequency resource information of the SPS DL-PRS determined from the SPS DL-PRS configuration information and according to a downlink slot of the SPS DL-PRS determined from the SPS DL-PRS deactivation information; and/or,
sending the SPS DL-PRS deactivation information to the plurality of base stations, to notify the plurality of base stations to stop sending the SPS DL-PRS according to a period and time-frequency resource information of the SPS DL-PRS determined from the SPS DL-PRS configuration information and according to a downlink slot of the SPS DL-PRS determined from the SPS DL-PRS deactivation information.

As an optional embodiment, determining, by the LMF, the SPS DL-PRS configuration information of the UE by SPS configuration after receiving the positioning request sent by the UE, includes:
determining, by the LMF, the SPS DL-PRS configuration information corresponding to a positioning QoS indicator according to a mapping relationship between the positioning QoS indicator and the SPS DL-PRS configuration information after receiving the positioning request carrying the positioning QoS indicator sent by the UE.

As an optional embodiment, after the LMF sends the SPS DL-PRS configuration information to the plurality of base stations including the serving base station of the UE, the method further includes:
determining, by the LMF, SPS DL-PRS activation information of at least one base station, and sending the SPS DL-PRS activation information to the serving base station; and/or
sending, by the LMF, SPS DL-PRS activation information of at least one non-serving base station to the serving base station after receiving the SPS DL-PRS activation information.

As an optional embodiment, the method further includes:
sending, by the LMF, SPS DL-PRS deactivation information of at least one base station to the at least one base station if the LMF receives the SPS DL-PRS deactivation information sent by the UE.

In a fourth aspect, an embodiment of the application provides a third method for sending a downlink positioning reference signal, including:
determining, by a non-serving base station, SPS DL-PRS activation information of the non-serving base station after receiving SPS DL-PRS configuration information of the non-serving base station configured by an LMF through SPS;
sending, by the non-serving base station, an SPS DL-PRS to a UE according to a period and time-frequency resource information of the SPS DL-PRS determined from the SPS DL-PRS configuration information of the non-serving base station and a downlink slot of the SPS DL-PRS determined from the SPS DL-PRS activation information of the non-serving base station;
stopping, by the non-serving base station, sending the SPS DL-PRS, in response to receiving SPS DL-PRS deactivation information of the non-serving base station forwarded by the LMF or a serving base station of the UE.

As an optional embodiment, determining, by the non-serving base station, the SPS DL-PRS activation information of the non-serving base station, includes:
receiving, by the non-serving base station, the SPS DL-PRS activation information through the LMF, or determining the SPS DL-PRS activation information by itself.

As an optional embodiment, after the non-serving base station determines the SPS DL-PRS activation information of the non-serving base station, the method further includes:
sending, by the non-serving base station, the SPS DL-PRS activation information to the serving base station through the LMF or an Xn interface between base stations.

In a fifth aspect, an embodiment of the application further provides a user equipment, including a memory, a transceiver and a processor:
the memory is configured to store a computer program;
the transceiver is configured to send and receive data under control of the processor; and the processor is configured to read the computer program in the memory and perform the following steps:

receiving SPS DL-PRS activation information of a plurality of base stations after receiving SPS DL-PRS configuration information of the plurality of base stations configured by an LMF through SPS; wherein the base stations include a serving base station and a non-serving base station;

receiving and measuring an SPS DL-PRS according to a period and time-frequency resource information of the SPS DL-PRS determined from the SPS DL-PRS configuration information and according to a downlink slot of the SPS DL-PRS determined from the SPS DL-PRS activation information, and obtaining a positioning measurement;

sending the positioning measurement to the LMF or the serving base station of the UE, to notify a base station corresponding to the SPS DL-PRS activation information to stop sending the SPS DL-PRS.

As an optional embodiment, the processor is specifically further configured to:

stop receiving the SPS DL-PRS; or stop receiving an SPS DL-PRS corresponding to SPS DL-PRS deactivation information of at least one base station in response to receiving the SPS DL-PRS deactivation information.

As an optional embodiment, the processor is specifically further configured to:

send SPS DL-PRS deactivation information of at least one base station, to notify the base station corresponding to the SPS DL-PRS deactivation information to stop sending the SPS DL-PRS.

As an optional embodiment, the processor is configured to:

send the positioning measurement to the base station corresponding to the SPS DL-PRS activation information through the LMF; or sending the positioning measurement to the serving base station, includes:

sending the positioning measurement to the serving base station, so that the serving base station stops sending the SPS DL-PRS signal based on the positioning measurement and notifies the non-serving base station to stop sending the SPS DL-PRS signal.

As an optional embodiment, the processor is further configured to:

send a positioning QoS indicator of the UE to the LMF, to notify the LMF to determine the SPS DL-PRS configuration information corresponding to the positioning QoS indicator according to the positioning QoS indicator.

As an optional embodiment, the processor is specifically configured to:

receive the SPS DL-PRS configuration information of the plurality of base stations from the LMF by the SPS configuration via LLP signaling or RRC signaling; and/or the receiving the SPS DL-PRS activation information of the plurality of base stations, includes:

receiving the SPS DL-PRS activation information of the plurality of base stations through DCI signaling or MAC-CE signaling.

As an optional embodiment, the processor is specifically configured to:

determine, activation information according to an activation field in the DCI signaling after determining that the activation information is the SPS DL-PRS activation information according to a newly added field in the received DCI signaling.

As an optional embodiment, the processor is specifically further configured to:

the SPS DL-PRS activation information includes: first SPS DL-PRS activation information of the serving base station and second SPS DL-PRS activation information of the non-serving base station;

determine the first SPS DL-PRS activation information according to a first field in a received signaling and the second SPS DL-PRS activation information according to a second field in the signaling; or determine the first SPS DL-PRS activation information through a field in a received first signaling after determining the corresponding serving base station according to an index indication field in the first signaling; and determine the second SPS DL-PRS activation information through a field in a received second signaling after determining the corresponding non-serving base station according to an index indication field in the second signaling.

In a sixth aspect, an embodiment of the application further provides a serving base station, including a memory, a transceiver and a processor:

the memory is configured to store a computer program; the transceiver is configured to send and receive data under control of the processor; and the processor is configured to read the computer program in the memory and perform the following steps:

determining SPS DL-PRS activation information of a plurality of base stations including the serving base station and a non-serving base station after receiving SPS DL-PRS configuration information of the serving base station configured by an LMF through SPS;

sending the SPS DL-PRS activation information of the plurality of base stations to a UE, and sending an SPS DL-PRS to the UE according to a period of the SPS DL-PRS determined from the SPS DL-PRS configuration information of the serving base station and a downlink slot of the SPS DL-PRS determined from SPS DL-PRS activation information of the serving base station;

stopping sending the SPS DL-PRS in response to receiving a positioning measurement or SPS DL-PRS deactivation information of the serving base station.

As an optional embodiment, the processor is specifically configured to:

the SPS DL-PRS activation information includes: first SPS DL-PRS activation information of the serving base station and second SPS DL-PRS activation information of the non-serving base station;

receive the first SPS DL-PRS activation information through the LMF, or determine the first SPS DL-PRS activation information by itself;

receive the second SPS DL-PRS activation information through the LMF or an Xn interface between base stations.

As an optional embodiment, the processor is specifically configured to:

receive the SPS DL-PRS configuration information of the serving base station from the LMF by the SPS configuration via LLP signaling or RRC signaling; and/or sending the SPS DL-PRS activation information of the plurality of base stations to the UE, includes:

sending the SPS DL-PRS activation information of the plurality of base stations through DCI signaling or MAC-CE signaling.

As an optional embodiment, the processor is specifically configured to:
determine activation information according to an activation field in the DCI signaling after determining that the activation information is the SPS DL-PRS activation information according to a newly added field in the sent DCI signaling.

As an optional embodiment, the processor is specifically configured to:
the SPS DL-PRS activation information includes: first SPS DL-PRS activation information of the serving base station and second SPS DL-PRS activation information of the non-serving base station;
determine the first SPS DL-PRS activation information according to a first field in a sent signaling and the second SPS DL-PRS activation information according to a second field in the signaling; or
determine the first SPS DL-PRS activation information through a field in a sent first signaling after determining the corresponding serving base station according to an index indication field in the first signaling; and determine the second SPS DL-PRS activation information through a field in a sent second signaling after determining the corresponding non-serving base station according to an index indication field in the second signaling.

As an optional embodiment, the processor is specifically further configured to:
notify the non-serving base station to stop sending an SPS DL-PRS, or send SPS DL-PRS deactivation information of the non-serving base station to the UE, after receiving the SPS DL-PRS deactivation information of the non-serving base station.

As an optional embodiment, the processor is specifically further configured to:
send the SPS DL-PRS deactivation information of the serving base station to the UE.

As an optional embodiment, the processor is specifically configured to:
send the SPS DL-PRS deactivation information of the non-serving base station to the UE through DCI signaling or MAC CE signaling; and/or
send the SPS DL-PRS deactivation information of the serving base station to the UE through DCI signaling or MAC CE signaling.

In a seventh aspect, an embodiment of the application further provides a network device, applied to an LMF, including a memory, a transceiver and a processor:
the memory is configured to store a computer program; the transceiver is configured to send and receive data under control of the processor; and the processor is configured to read the computer program in the memory and perform the following steps:
determining SPS DL-PRS configuration information of a UE configured through SPS, and sending the SPS DL-PRS configuration information to the UE and a plurality of base stations including a serving base station and a non-serving base station of the UE, after receiving a positioning request sent by the UE;
if the LMF receives a positioning measurement of the UE:
sending SPS DL-PRS deactivation information to the UE, to notify the UE to stop receiving an SPS DL-PRS according to a period and time-frequency resource information of the SPS DL-PRS determined from the SPS DL-PRS configuration information and according to a downlink slot of the SPS DL-PRS determined from the SPS DL-PRS deactivation information; and/or,
sending the SPS DL-PRS deactivation information to the plurality of base stations, to notify the plurality of base stations to stop sending the SPS DL-PRS according to a period and time-frequency resource information of the SPS DL-PRS determined from the SPS DL-PRS configuration information and according to a downlink slot of the SPS DL-PRS determined from the SPS DL-PRS deactivation information.

As an optional embodiment, the processor is specifically configured to:
determine the SPS DL-PRS configuration information corresponding to a positioning QoS indicator according to a mapping relationship between the positioning QoS indicator and the SPS DL-PRS configuration information after receiving the positioning request carrying the positioning QoS indicator sent by the UE.

As an optional embodiment, the processor is specifically further configured to:
after the LMF sends the SPS DL-PRS configuration information to the plurality of base stations including the serving base station of the UE:
determine SPS DL-PRS activation information of at least one base station, and send the SPS DL-PRS activation information to the serving base station; and/or
send SPS DL-PRS activation information of at least one non-serving base station to the serving base station after receiving the SPS DL-PRS activation information.

As an optional embodiment, the processor is specifically further configured to:
send SPS DL-PRS deactivation information of at least one base station to the at least one base station if the LMF receives the SPS DL-PRS deactivation information sent by the UE.

In an eighth aspect, an embodiment of the application further provides a non-serving base station, including a memory, a transceiver and a processor:
the memory is configured to store a computer program; the transceiver is configured to send and receive data under control of the processor; and the processor is configured to read the computer program in the memory and perform the following steps:
determining SPS DL-PRS activation information of the non-serving base station after receiving SPS DL-PRS configuration information of the non-serving base station configured by an LMF through SPS;
sending an SPS DL-PRS to a UE according to a period and time-frequency resource information of the SPS DL-PRS determined from the SPS DL-PRS configuration information of the non-serving base station and a downlink slot of the SPS DL-PRS determined from the SPS DL-PRS activation information of the non-serving base station;
stopping sending the SPS DL-PRS in response to receiving SPS DL-PRS deactivation information of the non-serving base station forwarded by the LMF or a serving base station of the UE.

As an optional embodiment, the processor is specifically configured to:
receive the SPS DL-PRS activation information through the LMF, or determine the SPS DL-PRS activation information by itself.

As an optional embodiment, the processor is specifically further configured to:

send the SPS DL-PRS activation information to the serving base station through the LMF or an Xn interface between base stations.

In a ninth aspect, an embodiment of the application further provides an apparatus for receiving a downlink positioning reference signal, including:

a receiving unit configured for a UE to receive SPS DL-PRS activation information of a plurality of base stations after receiving SPS DL-PRS configuration information of the plurality of base stations configured by an LMF through SPS; wherein the base stations include a serving base station and a non-serving base station;

a measurement unit configured for the UE to receive and measure an SPS DL-PRS according to a period and time-frequency resource information of the SPS DL-PRS determined from the SPS DL-PRS configuration information and according to a downlink slot of the SPS DL-PRS determined from the SPS DL-PRS activation information, and obtain a positioning measurement;

a sending unit configured for the UE to send the positioning measurement to the LMF or the serving base station of the UE, to notify a base station corresponding to the SPS DL-PRS activation information to stop sending the SPS DL-PRS.

As an optional embodiment, the sending unit is further configured to:

stop receiving the SPS DL-PRS; or stop receiving an SPS DL-PRS corresponding to SPS DL-PRS deactivation information of at least one base station in response to receiving the SPS DL-PRS deactivation information.

As an optional embodiment, the measurement unit is further configured to:

send SPS DL-PRS deactivation information of at least one base station, to notify the base station corresponding to the SPS DL-PRS deactivation information to stop sending the SPS DL-PRS.

As an optional embodiment, the sending unit is specifically configured to:

send the positioning measurement to the base station corresponding to the SPS DL-PRS activation information through the LMF; or send the positioning measurement to the serving base station, so that the serving base station stops sending the SPS DL-PRS signal based on the positioning measurement and notifies the non-serving base station to stop sending the SPS DL-PRS signal.

As an optional embodiment, the receiving unit is further configured to:

send a positioning QoS indicator of the UE to the LMF, to notify the LMF to determine the SPS DL-PRS configuration information corresponding to the positioning QoS indicator according to the positioning QoS indicator.

As an optional embodiment, the receiving unit is specifically configured to:

receive the SPS DL-PRS configuration information of the plurality of base stations from the LMF by the SPS configuration via LLP signaling or RRC signaling; and/or the receiving the SPS DL-PRS activation information of the plurality of base stations, includes:

receiving the SPS DL-PRS activation information of the plurality of base stations through DCI signaling or MAC-CE signaling.

As an optional embodiment, the receiving unit is specifically configured to: determine activation information according to an activation field in the DCI signaling after the UE determines that the activation information is the SPS DL-PRS activation information according to a newly added field in the received DCI signaling.

As an optional embodiment, the receiving unit is specifically configured to:

the SPS DL-PRS activation information includes: first SPS DL-PRS activation information of the serving base station and second SPS DL-PRS activation information of the non-serving base station;

determine the first SPS DL-PRS activation information according to a first field in a received signaling and the second SPS DL-PRS activation information according to a second field in the signaling; or determine the first SPS DL-PRS activation information through a field in a received first signaling after determining the corresponding serving base station according to an index indication field in the first signaling; and determine the second SPS DL-PRS activation information through a field in a received second signaling after determining the corresponding non-serving base station according to an index indication field in the second signaling.

In a tenth aspect, an embodiment of the application further provides a first apparatus for sending a downlink positioning reference signal, including:

a determining unit configured for a serving base station to determine SPS DL-PRS activation information of a plurality of base stations including the serving base station and a non-serving base station after receiving SPS DL-PRS configuration information of the serving base station configured by an LMF through SPS;

a sending unit configured for the serving base station to send the SPS DL-PRS activation information of the plurality of base stations to a UE, and send an SPS DL-PRS to the UE according to a period of the SPS DL-PRS determined from the SPS DL-PRS configuration information of the serving base station and a downlink slot of the SPS DL-PRS determined from SPS DL-PRS activation information of the serving base station;

a receiving unit configured for the serving base station to stop sending the SPS DL-PRS in response to receiving a positioning measurement or SPS DL-PRS deactivation information of the serving base station.

As an optional embodiment, the determining unit is specifically configured to:

the SPS DL-PRS activation information includes: first SPS DL-PRS activation information of the serving base station and second SPS DL-PRS activation information of the non-serving base station;

receive the first SPS DL-PRS activation information through the LMF, or determine the first SPS DL-PRS activation information by itself;

receive the second SPS DL-PRS activation information through the LMF or an Xn interface between base stations.

As an optional embodiment, the determining unit is specifically configured to:

receive the SPS DL-PRS configuration information of the serving base station from the LMF by the SPS configuration via LLP signaling or RRC signaling; and/or sending the SPS DL-PRS activation information of the plurality of base stations to the UE, includes:

sending the SPS DL-PRS activation information of the plurality of base stations through DCI signaling or MAC-CE signaling.

As an optional embodiment, the sending unit is specifically configured to:
  determine activation information according to an activation field in the DCI signaling after determining that the activation information is the SPS DL-PRS activation information according to a newly added field in the sent DCI signaling.

As an optional embodiment, the sending unit is specifically configured to:
  the SPS DL-PRS activation information includes: first SPS DL-PRS activation information of the serving base station and second SPS DL-PRS activation information of the non-serving base station;
  determine the first SPS DL-PRS activation information according to a first field in a sent signaling and the second SPS DL-PRS activation information according to a second field in the signaling; or
  determine the first SPS DL-PRS activation information through a field in a sent first signaling after determining the corresponding serving base station according to an index indication field in the first signaling; and determine the second SPS DL-PRS activation information through a field in a sent second signaling after determining the corresponding non-serving base station according to an index indication field in the second signaling.

As an optional embodiment, the apparatus further includes a deactivation unit configured to:
  notify the non-serving base station to stop sending an SPS DL-PRS, or send SPS DL-PRS deactivation information of the non-serving base station to the UE, after receiving the SPS DL-PRS deactivation information of the non-serving base station.

As an optional embodiment, the receiving unit is specifically further configured to:
  send the SPS DL-PRS deactivation information of the serving base station to the UE.

As an optional embodiment, the sending unit is specifically configured to:
  send the SPS DL-PRS deactivation information of the non-serving base station to the UE through DCI signaling or MAC CE signaling; and/or
  send the SPS DL-PRS deactivation information of the serving base station to the UE, includes:
  send the SPS DL-PRS deactivation information of the serving base station to the UE through DCI signaling or MAC CE signaling.

In an eleventh aspect, an embodiment of the application further provides a second apparatus for sending a downlink positioning reference signal, including:
  a transceiver unit configured for an LMF to determine SPS DL-PRS configuration information of a UE configured through SPS, and send the SPS DL-PRS configuration information to the UE and a plurality of base stations including a serving base station and a non-serving base station of the UE, after receiving a positioning request sent by the UE;
  a notification unit configured to: if the LMF receives a positioning measurement of the UE, send SPS DL-PRS deactivation information to the UE, to notify the UE to stop receiving an SPS DL-PRS; and/or, send the SPS DL-PRS deactivation information to the plurality of base stations, to notify the plurality of base stations to stop sending the SPS DL-PRS.

As an optional embodiment, the transceiver unit is specifically configured to:
  determine the SPS DL-PRS configuration information corresponding to a positioning QoS indicator according to a mapping relationship between the positioning QoS indicator and the SPS DL-PRS configuration information after receiving the positioning request carrying the positioning QoS indicator sent by the UE.

As an optional embodiment, the transceiver unit is further configured to:
  determine SPS DL-PRS activation information of at least one base station, and send the SPS DL-PRS activation information to the serving base station; and/or
  send SPS DL-PRS activation information of at least one non-serving base station to the serving base station after receiving the SPS DL-PRS activation information.

As an optional embodiment, the apparatus further includes a deactivation unit configured to:
  send SPS DL-PRS deactivation information of at least one base station to the at least one base station if the LMF receives the SPS DL-PRS deactivation information sent by the UE.

In a twelfth aspect, an embodiment of the application further provides a third apparatus for sending a downlink positioning reference signal, including:
  a determining unit configured for a non-serving base station to determine SPS DL-PRS activation information of the non-serving base station after receiving SPS DL-PRS configuration information of the non-serving base station configured by an LMF through SPS;
  a sending unit configured for the non-serving base station to send an SPS DL-PRS to a UE according to a period and time-frequency resource information of the SPS DL-PRS determined from the SPS DL-PRS configuration information of the non-serving base station and a downlink slot of the SPS DL-PRS determined from the SPS DL-PRS activation information of the non-serving base station;
  a receiving unit configured for the non-serving base station to stop sending the SPS DL-PRS in response to receiving SPS DL-PRS deactivation information of the non-serving base station forwarded by the LMF or a serving base station of the UE.

As an optional embodiment, the determining unit is specifically configured to:
  receive the SPS DL-PRS activation information through the LMF, or determine the SPS DL-PRS activation information by itself.

As an optional embodiment, the determining unit is specifically further configured to:
  send the SPS DL-PRS activation information to the serving base station through the LMF or an Xn interface between base stations.

In a thirteenth aspect, an embodiment of the application further provides a computer storage medium storing a computer program thereon, where the program, when executed by a processor, implements the steps of the method described in the first or second or third or fourth aspect described above.

These and other aspects of the application will be more clear and easy to understand in the description of the following embodiments.

BRIEF DESCRIPTION OF THE DRAWINGS

In order to illustrate the technical solutions in the embodiments of the application more clearly, the accompanying figures which need to be used in describing the embodiments will be introduced below briefly. Obviously the accompanying figures described below are only some embodiments of the application, and other accompanying figures can also be obtained by those ordinary skilled in the art according to these accompanying figures without creative labor.

DETAILED DESCRIPTION

Figure 1:
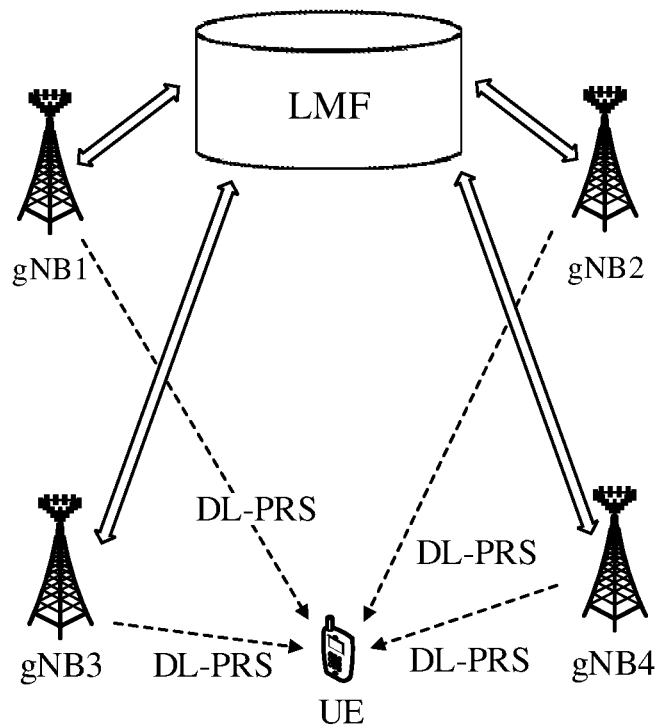
FIG. 1 is a schematic diagram of a DL-TDOA positioning method according to an embodiment of the application.

In order to make the objects, technical solutions and advantages of the embodiments of the application clearer, the embodiments of the application will be further illustrated below in details with reference to the accompanying figures. Obviously the described embodiments are merely a part of the embodiments of the application but not all the embodiments. Based upon the embodiments of the application, all of other embodiments obtained by those ordinary skilled in the art without creative work pertain to the protection scope of the embodiments of the application.

The technical solutions provided by the embodiments of the application may be applicable to various systems, especially 5G systems. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Long Term Evolution Advanced (LTE-A) system, Universal Mobile Telecommunication System (UMTS), Worldwide interoperability for Microwave Access (WiMAX) system, 5G New Radio (NR) system, etc. These systems all include terminal devices and network devices. A core network part may also be included in the system, such as Evloved Packet System (EPS), 5G System (5GS), etc.

The terminal device involved in the embodiments of the application may be a device for providing the voice and/or data connectivity to the user, a handheld device with the wireless connection function, or other processing device connected to the wireless modem, etc. In different systems, the terminal device may have different names. For example, in a 5G system, the terminal device may be referred to as User Equipment (UE). The wireless terminal device may communicate with one or more Core Networks (CNs) via the Radio Access Network (RAN), and the wireless terminal device may be a mobile terminal, such as a mobile telephone (or called "cellular" telephone), and a computer with the mobile terminal, for example, may be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal device may also be called system, subscriber unit, subscriber station, mobile station, mobile, remote station, access point, remote terminal, access terminal, user terminal, user agent, user device, which is not limited in the embodiments of the application.

The network device involved in the embodiments of the application may be a base station, which may include a plurality of cells providing services for terminals. Depending on specific application scenarios, the base station may also be called access point, or may be a device in the access network communicating with the wireless terminal via one or more sectors over the air interface, or other names. The network device may be used to exchange the received air frame with the Internet Protocol (IP) packet, and used as the router between the wireless terminal device and the rest of the access network, wherein the rest of the access network may include IP networks. The network device may further coordinate the attribute management of the air interface. For example, the network device involved in the embodiments of the application can be a network device (Base Transceiver Station (BTS)) in the Global System of Mobile communication (GSM) or Code Division Multiple Access (CDMA), or can be a network device (NodeB) in the Wideband Code Division Multiple Access (WCDMA), or can be an evolutional network device (evolutional Node B (eNB or e-NodeB)) in the Long Term Evolution (LTE) system, a 5G base station in the 5G network architecture (next generation system), or can be a Home evolved Node B (HeNB), a relay node, femto, pico, etc., which is not limited in the embodiments of the application. In some network structures, the network device may include a Centralized Unit (CU) node and a Distributed Unit (DU) node, and the centralized unit and the distributed unit may also be geographically separated.

One or more antennas may be used between the network device and the terminal device for Multi Input Multi Output (MIMO) transmission, which may be Single User MIMO (SU-MIMO) or Multiple User MIMO (MU-MIMO). According to the form and number of antenna combinations, the MIMO transmission may be 2D-MIMO, 3D-MIMO, FD-MIMO or massive-MIMO, or may be diversity transmission or precoding transmission or beamforming transmission, etc.

The term "and/or" in the embodiments of the application describes the association relationship of associated objects, indicating that there may be three relationships, for example, A and/or B may represent: only A, both A and B, and only B. The character "/" generally indicates that the associated objects have a kind of "or" relationship.

The term "a plurality of" in the embodiments of the application refers to two or more, and other quantifiers are similar thereto.

The application scenarios described in the embodiments of the application are intended to illustrate the technical solutions of the embodiments of the application more clearly, and do not constitute a limitation on the technical solutions provided in the embodiments of the application. As can be known by those ordinary skilled in the art, with the appearance of new application scenarios, the technical solutions provided in the embodiments of the application are also applicable to similar technical problems.

The technical solutions in the embodiments of the application will be described clearly and completely below in combination with the accompanying drawings in the embodiments of the application. Obviously, the described embodiments are only a part of the embodiments of the application but not all the embodiments. Based upon the embodiments of the application, all of other embodiments obtained by those ordinary skilled in the art without creative work pertain to the protection scope of the application.

Embodiment 1: the application scenarios of the embodiments of the application are briefly illustrated at first.

In downlink positioning, the Downlink Positioning Reference Signal (DL-PRS) is a cell-specific reference signal, and only the periodic DL-PRS is defined in the second version Rel-16 of the 5G specification, which is also understood as follows: once the periodic DL-PRS is configured, the DL-PRS will be sent periodically. The period of the DL-PRS may be configured as $2^\mu*\{4, 8, 16, 32, 64, 5, 10, 20, 40, 80, 160, 320, 640, 1280, 2560, 5120, 10240\}$ slots, where $\mu=0, 1, 2, 3$, corresponding respectively to the sub-carrier spacings of 15 KHz, 30 KHz, 60 KHz and 120 KHz of the DL-PRS.

The technical solution for downlink positioning mainly includes a delay-based DL-TDOA (DownLink Time Difference of Arrival) positioning method. For the delay based DL-TDOA positioning method, the position of a terminal is estimated through the relative time delay between base stations according to different propagation distances of the terminal relative to the base stations.

As shown in FIG. 1, at present, the specific implementation process of the DL-TDOA positioning method is as follows.

1) The gNB1, gNB2, gNB3 and gNB4 send periodic DL-PRS signals to a UE respectively.

2) The UE obtains the configuration information of the DL-PRSs sent by the gNBs (including gNB1, gNB2, gNB3 and gNB4) surrounding the UE according to the DL-TDOA assistance data provided by the LMF, and the UE obtains the time difference of arrival of the DL-PRSs (DL-PRS RSTD) by receiving the DL-PRSs from the gNBs (including gNB1, gNB2, gNB3 and gNB4).

3) The UE determines the position of the UE in a network-based positioning method or UE-based positioning method according to the obtained DL-PRS RSTD and other known information (such as the geographic coordinates of the gNB antenna).

Specifically, the UE may determine the position of the UE in two following ways.

In a first way, if the UE adopts the network-based positioning method, the UE reports the obtained DL-PRS RSTD measurement to the LMF unit, and the LMF uses the reported measurement and other known information (such as the geographic coordinates of the gNB antenna) to determine the position of the UE.

In a second way, if the UE adopts the UE-based positioning method, the UE determines the position of the UE according to the obtained DL-PRS RSTD and other information (such as the geographic coordinates of the gNB antenna) provided by the network.

To sum up, in the existing DL-PRS signal configuration, a plurality of base stations can only send the periodic DL-PRS when performing the positioning operation. On the one hand, once the periodic DL-PRS is configured, the DL-PRS will be sent periodically. Even when the UE no longer needs the positioning service, the base station will also continue to send the periodic DL-PRS, and then the UE may receive the periodic DL-PRS periodically for positioning measurement, so that the overhead of time-frequency resources is relatively large, resulting in a waste of resources. On the other hand, the periodic DL-PRS is sent in a fixed period. Even when the UE needs the positioning service, the UE must wait until the sending moment of the periodic DL-PRS before the UE can receive the DL-PRS for positioning operation, thus leading to a positioning delay. Such delay problem may be serious, especially when the positioning period is set to be relatively large.

In order to solve the above problems, an embodiment of the application proposes a method for receiving and sending a downlink positioning reference signal, which can be applied to the Ultra-Reliable and Low Latency Communications (URLLC) scenarios of 5G, and guarantee the latency requirement of service data transmission of the URLLC.

In the embodiment of the application, the configuration information of the DL-PRS is configured by SPS, and the activation information of the SPS DL-PRS is used to instruct the UE to start the positioning measurement. After the UE completes the positioning measurement, the base station is notified to stop sending the DL-PRS, thereby saving the overhead of time-frequency resources; and furthermore, in the embodiment of the application, the base station sends the SPS DL-PRS by means of SPS configuration and activation, and the period of the SPS DL-PRS is usually less than the period of the periodic DL-PRS, so the positioning delay can be reduced to a certain extent.

In addition, it should be noted that in the SPS scheme, radio resource is sent by means of first configuration and then activation, and the resource is allocated periodically to a specific UE; and the radio resource is stopped being sent through deactivation. For example, the base station uses the SPS resources in a certain TTI (Transport Time Interval), and the UE uses the SPS resources to send and receive data every time one SPS period passes. The base station does not need to issue the Physical Downlink Control Channel (PDCCH) in the SPS subframe to specify the allocated resources. Since the SPS has the characteristic of "allocated once, used many times", it is not necessary to issue the DCI (Downlink Control Information) to the UE in each TTI, thereby reducing the corresponding PDCCH overhead. Therefore, the overhead of the control signaling of the SPS is small.

Figure 2A:
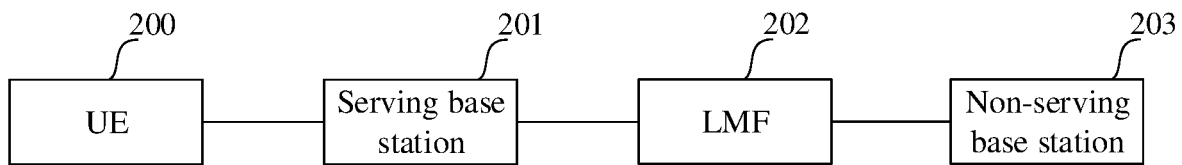
FIG. 2A is a schematic diagram of a system for receiving and sending a downlink positioning reference signal according to an embodiment of the application.

As shown in FIG. 2A, this embodiment provides a system for receiving and sending a downlink positioning reference signal. The system includes a UE 200, a serving base station 201, an LMF 202, and a non-serving base station 203. The implementation steps of the system will be illustrated below.

Furthermore, the system in this embodiment includes at least one serving base station and at least one non-serving base station. The base stations in the foregoing embodiment are merely examples, and this embodiment of the application does not make too many limitations on the base stations.

The implementation methods corresponding to all devices in the system of this embodiment will be illustrated respectively below.

For the UE, a method for receiving a downlink positioning reference signal method provided in an embodiment of this application can be applied to the UE and is applicable to the UE performing the positioning service. Specifically, after receiving the SPS DL-PRS configuration information of a plurality of base stations configured by the LMF through SPS, the UE receives the SPS DL-PRS activation information of the plurality of base stations, where the base stations include the serving base station and the non-serving base station; the UE receives and measures an SPS DL-PRS according to a period and the time-frequency resource information of the SPS DL-PRS determined from the SPS DL-PRS configuration information and according to a downlink slot of the SPS DL-PRS determined from the SPS DL-PRS activation information, and obtains a positioning measurement; and the UE sends the positioning measurement to the LMF or the serving base station of the UE, to notify a base station corresponding to the SPS DL-PRS activation information to stop sending the SPS DL-PRS.

During implementation, the UE in this embodiment receives the SPS DL-PRSs sent by at least one serving base station and at least one non-serving base station in a SPS scheme, where in the SPS scheme, the radio resources are sent by first configuration and then activation, and then allocated periodically to a specific UE. In this embodiment, the LMF performs the configuration via SPS for the UE, the serving base station and the non-serving base station, where the configuration information includes the sending (receiving) period and the time-frequency resource information of the SPS DL-PRS. After receiving the SPS DL-PRS configuration information, the UE determines a downlink slot of the SPS DL-PRS sent by the serving base station and a downlink slot of the SPS DL-PRS sent by the non-serving base station by receiving the SPS DL-PRS activation information of the serving base station and the non-serving base station; the UE receives the SPS DL-PRS sent by the serving base station on the downlink slot in the period corresponding to the serving base station and receives the SPS DL-PRS sent by the non-serving base station on the downlink slot in the period corresponding to the non-serving base station, and may determine the positioning measurement to complete the positioning measurement according to the reception time difference between the SPS DL-PRS of the serving base station and the SPS DL-PRS of the non-serving base station as well as the obtained geographic coordinates of the serving base station and the non-serving base station; and the UE may notify the serving base station and/or the non-serving base station to stop sending the SPS DL-PRS after completing the positioning measurement.

To sum up, the method provided by this embodiment of the application can enable the UE to receive the SPS DL-PRS activation information of the serving base station and the non-serving base station when having a positioning demand, so as to start receiving and measuring the SPS DL-PRSs of the serving base station and the non-serving base station, obtain the positioning measurement, and notify the serving base station and/or the non-serving base station to stop sending the SPS DL-PRS after completing the positioning measurement (that is, when the UE has no positioning demand), thereby reducing the overhead of downlink positioning reference signals. Also, since the period of the SPS DL-PRS in the SPS DL-PRS configuration information is shorter, the positioning delay can be reduced.

For the serving base station, an embodiment of the application provides a method for sending a downlink positioning reference signal, which is applied to the serving base station of the UE that needs a positioning service. Specifically, the serving base station determines the SPS DL-PRS activation information of a plurality of base stations including the serving base station and the non-serving base station after receiving the SPS DL-PRS configuration information of the serving base station configured by the LMF through SPS; the serving base station sends the SPS DL-PRS activation information of the plurality of base stations to a UE, and sends an SPS DL-PRS to the UE according to a period of the SPS DL-PRS determined from the SPS DL-PRS configuration information of the serving base station and a downlink slot of the SPS DL-PRS determined from SPS DL-PRS activation information of the serving base station; and the serving base station stops sending the SPS DL-PRS, in response to receiving a positioning measurement or the SPS DL-PRS deactivation information of the serving base station.

The serving base station in this embodiment is configured to send the SPS DL-PRS activation information of the serving base station and the non-serving base station to the UE when the UE needs the positioning service, and send the SPS DL-PRS to the UE on the downlink slot in the period of the SPS DL-PRS; and stop sending the SPS DL-PRS in response to receiving the positioning measurement, or stop sending the SPS DL-PRS in response to receiving the SPS DL-PRS deactivation information. Therefore, in this embodiment of the application, the serving base station sends the SPS DL-PRS to the UE with the positioning demand, and stops sending the SPS DL-PRS to the UE after the UE finishing positioning or does not need the positioning service. As such, the serving base station in this embodiment will not send the SPS DL-PRS to the UE when the UE does not need the positioning service, saving the overhead of the downlink positioning reference signal. Also, since the period of the SPS DL-PRS sent by the serving base station to the UE is shorter, the positioning delay can be reduced.

For the LMF, a method for sending a downlink positioning reference signal provided in an embodiment of the application can be applied to the LMF device to solve the problem of relatively large overhead of time-frequency resources in the UE positioning service. Specifically, the LMF determines the SPS DL-PRS configuration information of the UE configured through SPS, and sends the SPS DL-PRS configuration information to the UE and a plurality of base stations including the serving base station and the non-serving base station of the UE, in response to receiving a positioning request sent by the UE; and if the LMF receives a positioning measurement of the UE: sends the SPS DL-PRS deactivation information to the UE, to notify the UE to stop receiving an SPS DL-PRS according to a period and the time-frequency resource information of the SPS DL-PRS determined from the SPS DL-PRS configuration information and according to a downlink slot of the SPS DL-PRS determined from the SPS DL-PRS deactivation information; and/or, sends the SPS DL-PRS deactivation information to the plurality of base stations, to notify the plurality of base stations to stop sending the SPS DL-PRS according to a period and the time-frequency resource information of the SPS DL-PRS determined from the SPS DL-PRS configuration information and according to a downlink slot of the SPS DL-PRS determined from the SPS DL-PRS deactivation information.

During implementation, in this embodiment, the LMF performs configuration via SPS for the UE, the serving base station and the non-serving base station, and sends the SPS DL-PRS configuration information to the corresponding UE, serving base station and non-serving base station. In the SPS scheme, radio resources are sent by first configuration and then activation, and allocated periodically to a specific UE, so the serving base station and the non-serving base station can send the SPS DL-PRS to the UE on the downlink slot in the period of the SPS DL-PRS according to the SPS DL-PRS configuration information and the SPS DL-PRS activation information after receiving the SPS DL-PRS configuration information. If the LMF receives the positioning measurement of the UE, meaning that the UE has completed the positioning measurement, then the LMF sends the SPS DL-PRS deactivation information to the UE, to notify the UE to stop receiving the SPS DL-PRS on the downlink slot in the period of the SPS DL-PRS of the serving base station and/or stop receiving the SPS DL-PRS on the downlink slot in the period of the SPS DL-PRS of the non-serving base station; and/or, notifies the serving base station and/or the non-serving base station to stop sending the SPS DL-PRS on the downlink slot in the period of the corresponding SPS DL-PRS. Therefore, the method provided by this embodiment of the application can effectively reduce the overhead of the downlink positioning reference signal and improve the spectrum efficiency of the system.

For the non-serving base station, an embodiment of the application further provides a method for sending a downlink positioning reference signal, which is applied to the non-serving base station of the UE with a positioning demand. The non-serving base station determines the SPS DL-PRS activation information of the non-serving base station in response to receiving the SPS DL-PRS configuration information of the non-serving base station configured by the LMF through SPS; the non-serving base station sends an SPS DL-PRS to the UE according to a period and the time-frequency resource information of the SPS DL-PRS determined from the SPS DL-PRS configuration information of the non-serving base station and a downlink slot of the SPS DL-PRS determined from the SPS DL-PRS activation information of the non-serving base station; and the non-serving base station stops sending the SPS DL-PRS in response to receiving the SPS DL-PRS deactivation information of the non-serving base station forwarded by the LMF or the serving base station of the UE.

In this embodiment, in response to receiving the SPS DL-PRS configuration information sent by the LMF, the non-serving base station can determine the period and the time-frequency resource information of the SPS DL-PRS, and determine to send the SPS DL-PRS to the UE on the downlink slot in the period of the SPS DL-PRS according to the SPS DL-PRS activation information to enable the UE to perform the positioning measurement; and in response to receiving the SPS DL-PRS deactivation information, which means that the UE has completed the positioning measurement, the non-serving base station stops sending the SPS DL-PRS, reducing the overhead of the downlink reference signaling effectively.

Figure 2B:
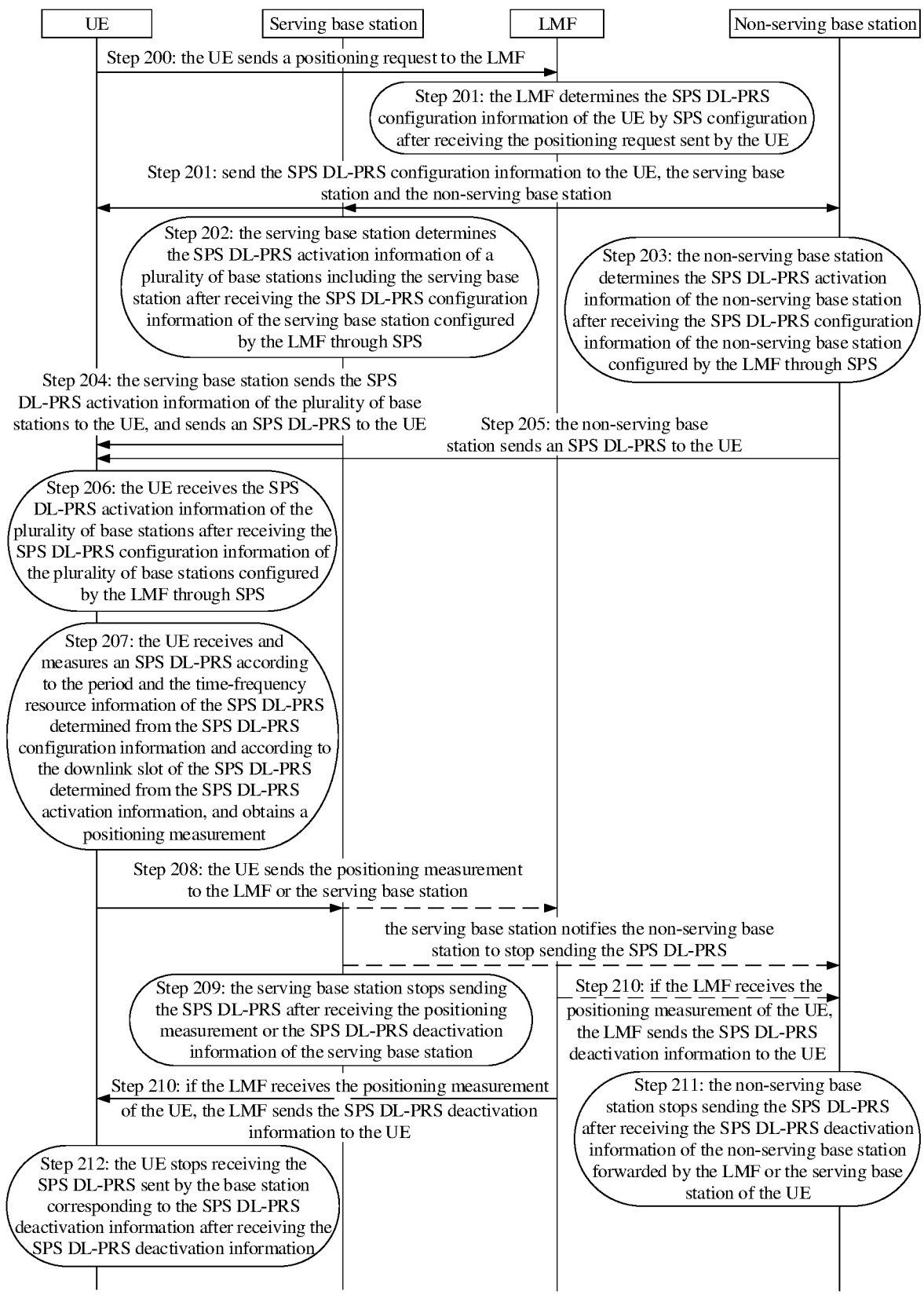
FIG. 2B is a flowchart of interaction between terminals according to an embodiment of the application.

As shown in FIG. 2B, the interaction process of devices in the system is as follows.

Step 200: the UE sends a positioning request to the LMF.

Optionally, the positioning request carries a positioning QoS indicator to notify the LMF to determine the SPS DL-PRS configuration information corresponding to the positioning QoS indicator according to the positioning QoS indicator.

During implementation, the UE may directly send the positioning request to the LMF, or may send the positioning request carrying the positioning QoS indicator to the LMF, which is not limited too much in this embodiment of the application.

Step 201: the LMF determines the SPS DL-PRS configuration information of the UE configured via SPS in response to receiving the positioning request sent by the UE, and sends the SPS DL-PRS configuration information to the UE, the serving base station and the non-serving base station.

It can be understood that, in this embodiment, the SPS DL-PRS configuration information is pre-configured by the LMF, and may be pre-configured by the LMF according to a preset algorithm or according to different positioning QoS indicators.

If no positioning QoS indicator is carried in the positioning request, the LMF may determine the SPS DL-PRS configuration information of the UE according to the preset algorithm, and configure the SPS DL-PRS configuration information of the UE via SPS.

Alternatively, if a positioning QoS indicator is carried in the positioning request, the LMF determines the SPS DL-PRS configuration information corresponding to the positioning QoS indicator according to the mapping relationship between the positioning QoS indicator and the SPS DL-PRS configuration information.

It should be noted that the SPS DL-PRS configuration information in this embodiment includes: the period and the time-frequency resource information of the SPS DL-PRS, where the time-frequency resource information includes but not limited to: the bandwidth of the SPS DL-PRS; the number of Orthogonal Frequency Division Multiplexing (OFDM) symbols; the comb size; the start position of the frequency-domain Resource Element (RE), etc.

The LMF may also send the SPS DL-PRS configuration information to the non-serving base station.

It should be noted that the LMF only needs to send the SPS DL-PRS configuration information once to the UE, the serving base station and the non-serving base station after receiving the positioning request sent by the UE in this embodiment of the application. In the subsequent process of the UE positioning measurement, the LMF will not send the SPS DL-PRS configuration information again.

As an optional embodiment, after the LMF sends the SPS DL-PRS configuration information to the plurality of base stations including the serving base station of the UE, the method further includes:

the LMF determines the SPS DL-PRS activation information of at least one base station, and sends the SPS DL-PRS activation information to the serving base station; and optionally, the LMF determines the first SPS DL-PRS activation information of the serving base station and the second SPS DL-PRS activation information of the non-serving base station, and sends the first SPS DL-PRS activation information and the second SPS DL-PRS activation information to the serving base station;

and/or, the LMF sends the SPS DL-PRS activation information of the non-serving base station to the serving base station in response to receiving the SPS DL-PRS activation information of at least one non-serving base station.

Step 202: the serving base station determines the SPS DL-PRS activation information of a plurality of base stations including the serving base station and the non-serving base station, in response to receiving the SPS DL-PRS configuration information of the serving base station configured by the LMF through SPS.

Optionally, the serving base station receives the SPS DL-PRS configuration information of the serving base station configured by the LMF via the SPS through LPP signaling or RRC signaling.

It should be noted that the SPS DL-PRS activation information in this embodiment of the application is sent through SPS activation. In the SPS scheme, information is sent by first configuration and then activation, and the activation information is also sent periodically, so the SPS DL-PRS activation information in this embodiment is also sent periodically. However, the period of the SPS DL-PRS activation information in this embodiment is shorter than the period of the present periodic DL-PRS, reducing the positioning delay.

The SPS DL-PRS activation information includes: the first SPS DL-PRS activation information of the serving base station and the second SPS DL-PRS activation information of the non-serving base station; and then the serving base station may determine the SPS DL-PRS activation information of itself and the non-serving base station, and the specific determining ways are as follows.

In a first method, the serving base station determines the first SPS DL-PRS activation information.

Figure 2C:
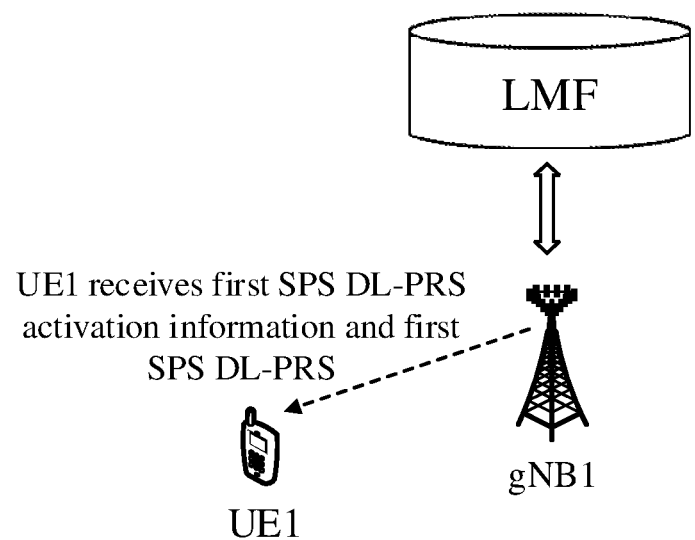
FIG. 2C is a schematic diagram in which the serving base station determines the first SPS DL-PRS activation information according to an embodiment of the application.

As shown in FIG. 2C, the serving base station (gNB1) receives the first SPS DL-PRS activation information through the LMF, or determines the first SPS DL-PRS activation information by itself.

Specifically, the serving base station determines the first SPS DL-PRS activation information according to a preset algorithm.

In a second method, the serving base station determines the second SPS DL-PRS activation information.

Figure 2D:
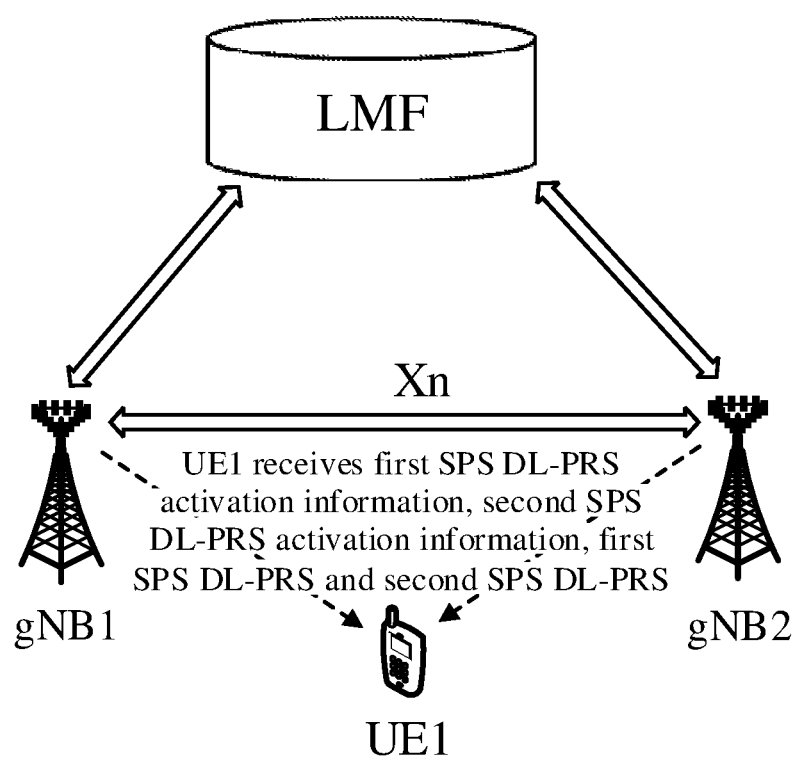
FIG. 2D is a schematic diagram in which the serving base station determines the second SPS DL-PRS activation information according to an embodiment of the application.

As shown in FIG. 2D, the serving base station (gNB1) receives the second SPS DL-PRS activation information through the LMF or the Xn interface between base stations; where the Xn interface may be an interface between the serving base station and the non-serving base station.

Step 203: the non-serving base station determines the SPS DL-PRS activation information of the non-serving base station after receiving the SPS DL-PRS configuration information of the non-serving base station configured by the LMF through SPS.

As an optional embodiment, the non-serving base station receives the SPS DL-PRS activation information through the LMF, or the non-serving base station determines the SPS DL-PRS activation information.

It should be noted that the non-serving base station determines its own SPS DL-PRS activation information according to a preset algorithm.

As an optional embodiment, after the non-serving base station determines the SPS DL-PRS activation information of the non-serving base station, the method further includes:

the non-serving base station sends the SPS DL-PRS activation information to the serving base station through the LMF or an Xn interface between base stations.

Here, the above-mentioned steps 202 and 203 are executed in no particular order, and may also be executed at the same time, which is not limited here.

Step 204: the serving base station sends the SPS DL-PRS activation information of the plurality of base stations to the UE, and sends an SPS DL-PRS to the UE according to a period of the SPS DL-PRS determined from the SPS DL-PRS configuration information of the serving base station and a downlink slot of the SPS DL-PRS determined from the SPS DL-PRS activation information of the serving base station.

It should be noted that the SPS DL-PRS activation information includes: the first SPS DL-PRS activation information of the serving base station and the second SPS DL-PRS activation information of the non-serving base station.

Figure 2E:
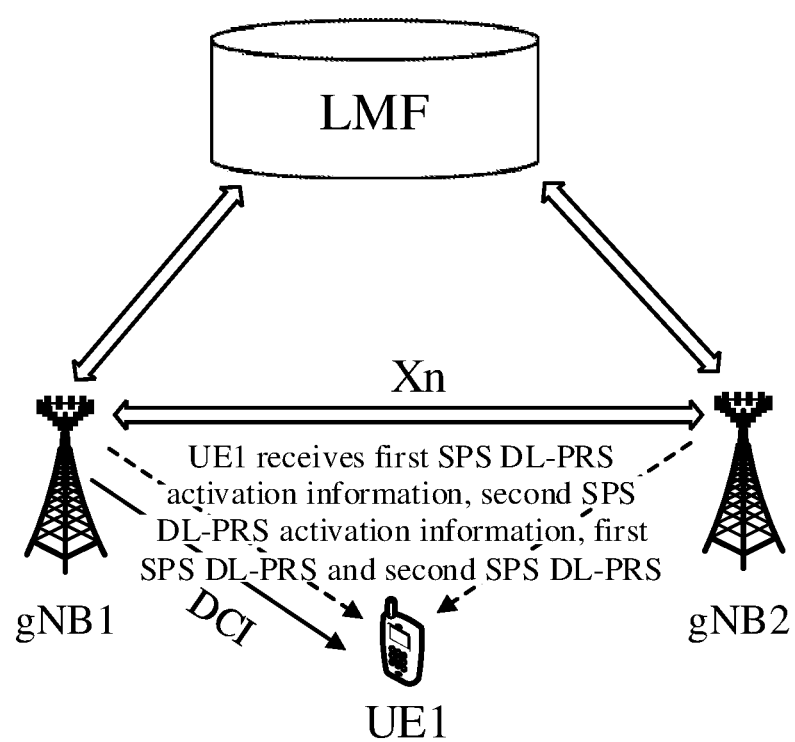
FIG. 2E is a schematic diagram in which the serving base station sends the SPS DL-PRS activation information of a plurality of base stations to the UE according to an embodiment of the application.

The serving base station sends the SPS DL-PRS activation information of the plurality of base stations to the UE, including:

as shown in FIG. 2E, the serving base station sends the first SPS DL-PRS activation information of the serving base station and the second SPS DL-PRS activation information of the non-serving base station to the UE.

It should be noted that the period for the serving base station to send the DL-PRS to the UE is the period of the SPS DL-PRS determined from the SPS DL-PRS configuration information of the serving base station, and the downlink slot for sending the DL-PRS is the downlink slot of the SPS DL-PRS determined from the SPS DL-PRS activation information of the serving base station, which is also understood as: the serving base station sends the DL-PRS to the UE on the downlink slot within the period.

Optionally, the serving base station sends the SPS DL-PRS activation information of the plurality of base stations through DCI signaling or MAC-CE signaling.

Here, the DL-PRS is generally sent in the form of a DL-PRS resource setting, that is, the serving base station sends the DL-PRS resource setting to the UE on the downlink slot within the period.

Step 205: the non-serving base station sends an SPS DL-PRS to the UE according to a period and the time-frequency resource information of the SPS DL-PRS determined from the SPS DL-PRS configuration information of the non-serving base station and a downlink slot of the SPS DL-PRS determined from the SPS DL-PRS activation information of the non-serving base station.

It should be noted that the period for the non-serving base station to send the DL-PRS to the UE is the period of the SPS DL-PRS determined from the SPS DL-PRS configuration information of the non-serving base station, and the downlink slot for sending the DL-PRS is the downlink slot of the SPS DL-PRS determined from the SPS DL-PRS activation information of the non-serving base station, which is also understood as: the non-serving base station sends the DL-PRS to the UE on the downlink slot within the period.

Here, the DL-PRS is generally sent in the form of a DL-PRS resource setting, that is, the non-serving base station sends the DL-PRS resource setting to the UE on the downlink slot within the period.

Here, the above-mentioned steps 204 and 205 are executed in no particular order, and may also be executed at the same time, which is not limited here.

Step 206: the UE receives the SPS DL-PRS activation information of the plurality of base stations after receiving the SPS DL-PRS configuration information of the plurality of base stations configured by the LMF through SPS.

Here, the SPS DL-PRS configuration information of the plurality of base stations may be the same or different, which is not limited too much in this embodiment.

In an implementation, the UE receives the first SPS DL-PRS activation information of the serving base station after receiving the first SPS DL-PRS configuration information of the serving base station; and the UE receives the second SPS DL-PRS activation information of the non-serving base station after receiving the second SPS DL-PRS configuration information of the non-serving base station.

As an optional embodiment, the UE receives the SPS DL-PRS configuration information of the plurality of base stations configured by the LMF via SPS, including:

the UE receives the SPS DL-PRS configuration information of the plurality of base stations configured the LMF via SPS through LPP signaling or RRC signaling.

As an optional embodiment, the receiving the SPS DL-PRS activation information of the plurality of base stations includes:

the UE receives the SPS DL-PRS activation information of the plurality of base stations through DCI signaling or MAC-CE signaling.

Step 207: the UE receives and measures an SPS DL-PRS according to the period and the time-frequency resource information of the SPS DL-PRS determined from the SPS DL-PRS configuration information and according to the downlink slot of the SPS DL-PRS determined from the SPS DL-PRS activation information, and obtains a positioning measurement.

It should be noted that the UE receives the SPS DL-PRS sent by the serving base station or the non-serving base station in a manner different from the above mentioned signaling (i.e., LPP signaling, RRC signaling, DCI signaling and MAC-CE signaling).

The SPS DL-PRS configuration information includes: the first SPS DL-PRS configuration information of the serving base station and the second SPS DL-PRS configuration information of the non-serving base station; and the SPS DL-PRS activation information includes: the first SPS DL-PRS activation information of the serving base station and the second SPS DL-PRS activation information of the non-serving base station.

The first period of the SPS DL-PRS is determined according to the first SPS DL-PRS configuration information, and the first downlink slot of the SPS DL-PRS is determined according to the first SPS DL-PRS activation information.

The second period of the SPS DL-PRS is determined according to the second SPS DL-PRS configuration information, and the second downlink slot of the SPS DL-PRS is determined according to the second SPS DL-PRS activation information.

Then the UE receives the first SPS DL-PRS on the first downlink slot in the first period; and the UE receives the second SPS DL-PRS on the second downlink slot in the second period.

As an optional embodiment, the UE determines the SPS DL-PRS RSTD (time difference of arrival of downlink reference signals under SPS) according to the received first SPS DL-PRS and second SPS DL-PRS, and determines the position of the UE according to the SPS DL-PRS RSTD and the pre-obtained information of base station (such as the geographic coordinates of the gNB antenna).

Step 208: the UE sends the positioning measurement to the LMF or the serving base station, to notify the base station corresponding to the SPS DL-PRS activation information to stop sending the SPS DL-PRS.

As an optional embodiment, after the UE sends the positioning measurement, two embodiments are further included, specifically as follows.

In a first way, the UE stops receiving the SPS DL-PRS.

In a second way, in response to receiving the SPS DL-PRS deactivation information of at least one base station sent by the LMF or the serving base station, the UE stops receiving the SPS DL-PRS corresponding to the SPS DL-PRS deactivation information.

In an implementation, the UE sends the positioning measurement to the base station corresponding to the SPS DL-PRS activation information through the LMF, where the UE may send the positioning measurement to the serving base station and/or the non-serving base station through the LMF.

Or, the UE sends the positioning measurement to the serving base station, so that the serving base station stops sending the DL-PRS signal based on the positioning measurement and notifies the non-serving base station to stop sending the SPS DL-PRS signal.

Here, the UE stops receiving the first SPS DL-PRS sent by the serving base station in response to receiving the first SPS DL-PRS deactivation information of the serving base station; and/or, the UE stops receiving the second SPS DL-PRS sent by the non-serving base station in response to receiving the second SPS DL-PRS deactivation information of the non-serving base station.

It should be noted that the UE, after determining the positioning measurement, may firstly send the positioning measurement to the LMF or the serving base station, and then stop receiving the SPS DL-PRS for positioning measurement in response to the SPS DL-PRS deactivation information received from the LMF or the serving base station; or may stop receiving the SPS DL-PRS for positioning measurement, and send the positioning measurement to the LMF or the serving base station.

As an optional embodiment, after the UE obtains the positioning measurement, the following implementation steps are further included:

the UE sends the SPS DL-PRS deactivation information of at least one base station to the LMF or the serving base station, to notify the base station corresponding to the SPS DL-PRS deactivation information to stop sending the SPS DL-PRS.

Optionally, the UE notifies the serving base station to stop sending the first SPS DL-PRS through the LMF after sending the first SPS DL-PRS deactivation information of the serving base station to the LMF; and/or, the UE notifies the non-serving base station to stop sending the second SPS DL-PRS through the LMF after sending the second SPS DL-PRS deactivation information of the non-serving base station to the LMF.

Optionally, the UE notifies the serving base station to stop sending the first SPS DL-PRS after sending the first SPS DL-PRS deactivation information of the serving base station to the serving base station; and/or, the UE notifies the non-serving base station to stop sending the second SPS DL-PRS through the serving base station after sending the second SPS DL-PRS deactivation information of the non-serving base station to the serving base station. Here, if the serving base station receives the SPS DL-PRS deactivation information of a plurality of base stations sent by the UE, the serving base station determines the base station corresponding to the SPS DL-PRS deactivation information according to the identification field in the SPS DL-PRS deactivation information.

Step 209: the serving base station stops sending the SPS DL-PRS in response to receiving the positioning measurement or the SPS DL-PRS deactivation information of the serving base station.

As an optional embodiment, the serving base station may also receive the SPS DL-PRS deactivation information of the non-serving base station sent by the UE or the LMF, to notify the non-serving base station to stop sending the SPS DL-PRS; or send the SPS DL-PRS deactivation information of the non-serving base station to the UE, to notify the UE to stop receiving the SPS DL-PRS of the non-serving base station.

As an optional embodiment, after the serving base station receives the positioning measurement or the SPS DL-PRS deactivation information of the serving base station, the method further includes:
the serving base station sends the SPS DL-PRS deactivation information of the serving base station to the UE, to notify the UE to stop receiving the SPS DL-PRS of the serving base station.

As an optional embodiment, the serving base station sends the SPS DL-PRS deactivation information of the non-serving base station to the UE through DCI signaling or MAC CE signaling.

As an optional embodiment, the serving base station sends the SPS DL-PRS deactivation information of the serving base station to the UE through DCI signaling or MAC CE signaling.

Step 210: if the LMF receives the positioning measurement of the UE, the LMF sends the SPS DL-PRS deactivation information to the UE, to notify the UE to stop receiving the SPS DL-PRS; and/or, sends the SPS DL-PRS deactivation information to the plurality of base stations, to notify the plurality of base stations to stop sending the SPS DL-PRS.

As an optional embodiment, if the LMF receives the SPS DL-PRS deactivation information of at least one base station sent by the UE, the LMF sends the SPS DL-PRS deactivation information to the at least one base station. Optionally, if the LMF receives the first SPS DL-PRS deactivation information of the serving base station and the second SPS DL-PRS deactivation information of the non-serving base station sent by the UE, the LMF sends the first SPS DL-PRS deactivation information to the serving base station, and sends the second SPS DL-PRS deactivation information to the non-serving base station.

Step 211: the non-serving base station stops sending the SPS DL-PRS in response to receiving the SPS DL-PRS deactivation information of the non-serving base station forwarded by the LMF or the serving base station of the UE.

Step 212: the UE stops receiving the SPS DL-PRS sent by the base station corresponding to the SPS DL-PRS deactivation information in response to receiving the SPS DL-PRS deactivation information.

The above steps 209, 210, 211 and 212 are executed in no particular order, and are specifically determined according to the implementation order of the steps. Here, the execution order of steps 209-212 is not limited by the sequence of step numbers.

The SPS DL-PRS activation information in this embodiment of the application may be determined in various ways, and the SPS DL-PRS activation information mentioned in this embodiment will be described in detail below.

The SPS DL-PRS activation information described in this embodiment is transmitted through the DCI signaling or MAC-CE signaling; and the rules for determining the SPS DL-PRS activation information are as follows.

Rule 1, applicable to the case where the SPS DL-PRS activation information is transmitted through the DCI signaling and determined by a newly added field and an activation field:
the activation or deactivation is determined through the activation field in the DCI signaling, and the activation information in the DCI signaling is determined to be SPS DL-PRS activation information or PDSCH activation information through the newly added field in the DCI signaling.

It should be noted that the Physical Downlink Shared Channel (PDSCH) in the 5G system supports the SPS configuration, so this method can be used to determine whether the activation information is PDSCH activation information or DL-PRS activation information.

According to this rule, each DCI signaling carries one piece of SPS DL-PRS activation information, that is to say, each of different base stations corresponds to one newly added bit for representing the SPS DL-PRS activation information of the base station, that is, the serving base station corresponds to one newly added bit representing the SPS DL-PRS activation information of the serving base station, and the non-serving base station corresponds to one newly added bit representing the SPS DL-PRS activation information of the non-serving base station.

Rule 2, applicable to the case where the SPS DL-PRS activation information is transmitted through the DCI signaling or MAC-CE signaling and determined by introducing a new field.

Specifically, there are two cases as follows.

Here, the SPS DL-PRS activation information includes: the first SPS DL-PRS activation information of the serving base station and the second SPS DL-PRS activation information of the non-serving base station.

1) The first SPS DL-PRS activation information is determined according to the first field in the DCI signaling or MAC-CE signaling, and the second SPS DL-PRS activation information is determined according to the second field in the signaling.

Here, the first field and the second field are configured independently, the numbers of bits occupied by the first field and the second field may be the same or different, and the numbers of bits occupied by the first field and the second field are positive integers greater than or equal to 1.

For example, the first SPS DL-PRS activation information and the second SPS DL-PRS activation information are respectively determined by two fields as follows.

DL-PRS request-1: the number of bits occupied by this field is $\{0, 1, \ldots, N1\}$, where N1 is a positive integer greater than or equal to 1; and the field DL-PRS request-1 represents triggering the sending of the first SPS DL-PRS.

DL-PRS request-2: the number of bits occupied by this field is $\{0, 1, \ldots, N2\}$, where N2 is a positive integer greater than or equal to 1; and the field DL-PRS request-2 represents triggering the sending of the second SPS DL-PRS.

According to this rule, only one signaling is enough to carry two pieces of SPS DL-PRS activation information.

2) The SPS DL-PRS activation information is determined through a new field in the DCI signaling or MAC-CE signaling, and the base station corresponding to the SPS DL-PRS activation information is determined as the serving base station or non-serving base station through an index indication field in the DCI signaling or MAC-CE signaling.

Based on the above rule 1, the description will be given below from the UE side and the serving base station side respectively.

For the UE side, as an optional embodiment, the UE receives the SPS DL-PRS activation information of the plurality of base stations, including:

the UE determines the activation information according to an activation field in the DCI signaling after determining that the activation information is the SPS DL-PRS activation information according to a newly added field in the received DCI signaling.

For the serving base station side, as an optional embodiment, the serving base station sends the SPS DL-PRS activation information of the plurality of base stations to the UE, including:

the serving base station determines the activation information according to an activation field in the DCI signaling after determining that the activation information is the SPS DL-PRS activation information according to a newly added field in the sent DCI signaling.

Based on the above rule 2, the description will be given below from the UE side and the serving base station side respectively.

For the UE side, as an optional embodiment, the UE receives the SPS DL-PRS activation information of the plurality of base stations, including two cases as follows.

1) The UE determines the first SPS DL-PRS activation information according to a first field in the received signaling and the second SPS DL-PRS activation information according to a second field in the signaling.

2) The UE determines the first SPS DL-PRS activation information through a field in the received first signaling after determining the corresponding serving base station according to an index indication field in the first signaling, and determines the second SPS DL-PRS activation information through a field in the received second signaling after determining the corresponding non-serving base station according to an index indication field in the second signaling.

For the serving base station side, as an optional embodiment, the serving base station sends the SPS DL-PRS activation information of the plurality of base stations to the UE, including two cases as follows.

1) The serving base station determines the first SPS DL-PRS activation information according to a first field in the sent signaling and the second SPS DL-PRS activation information according to a second field in the signaling.

2) The serving base station determines the first SPS DL-PRS activation information through a field in the sent first signaling after determining the corresponding serving base station according to an index indication field in the first signaling, and determines the second SPS DL-PRS activation information through a field in the sent second signaling after determining the corresponding non-serving base station according to an index indication field in the second signaling.

Similarly, since the SPS DL-PRS deactivation information and SPS DL-PRS activation information provided in the embodiments of the application are different states of the same information, the above rules are also applicable to the SPS DL-PRS deactivation information in the embodiments of the application based on the above description of the SPS DL-PRS activation information.

Furthermore, it should be noted that the specific manner to determine the downlink slot of the SPS DL-PRS according to the SPS DL-PRS activation information in the embodiment of the application is as follows.

The SPS DL-PRS activation information in the embodiment of the application includes the activation occasion of the SPS DL-PRS and the sending occasion of the SPS DL-PRS, that is, the occasion information of which slot is used for activating the SPS DL-PRS and which slot is used for sending the SPS DL-PRS. Specifically, the SPS DL-PRS activation information may also include an offset between slots, where the offset refers to an offset between the slot for activating the SPS DL-PRS in the DCI signaling or MAC-CE signaling and the slot in which the SPS DL-PRS is actually sent, where the offset is used to indicate the SPS DL-PRS corresponding to the offset; and the SPS DL-PRS activation information in the embodiment of the application includes the downlink slot for sending the SPS DL-PRS corresponding to the offset.

It should be noted that the SPS DL-PRS sent in the embodiment of the application may also be sent in a form of a set, that is, the SPS DL-PRS sent by the base station to the UE in the embodiment of the application may be a separate SPS DL-PRS, or may be an SPS DL-PRS set.

Here, the SPS DL-PRS set is a set of several SPS DL-PRSs, one SPS DL-PRS may occupy up to 12 OFDM symbols, and one SPS DL-PRS set may be configured with up to 64 SPS DL-PRSs.

It should be noted that the offset in this embodiment corresponds to two types of resources. One case is that the offset corresponds to the SPS DL-PRS, and the other case is that the offset corresponds to the SPS DL-PRS set.

As an optional embodiment, the SPS DL-PRS activation information in the embodiment of the application includes: the offset between the slot for activating the SPS DL-PRS in the DCI signaling or MAC-CE signaling and the slot in which the SPS DL-PRS is actually sent; and the downlink slot for sending the SPS DL-PRS corresponding to the offset.

It is easy to understand that, in this case, the offset corresponds to the SPS DL-PRS, and each SPS DL-PRS is configured with one piece of offset information. If one slot includes a plurality of SPS DL-PRSs, then the plurality of SPS DL-PRSs correspond to different offsets. Sending/receiving of each SPS DL-PRS should be completed within the downlink slot indicated by the offset; and the UE may need to complete the receiving of a plurality of SPS DL-PRSs in different downlink slots during the period of one SPS DL-PRS.

As an optional embodiment, the SPS DL-PRS activation information in the embodiment of the application includes: the offset between the slot for activating the SPS DL-PRS set in the DCI signaling or MAC-CE signaling and the slot in which the SPS DL-PRS set is actually sent, and the downlink slot for sending the SPS DL-PRS set corresponding to the offset.

It is easy to understand that, in this case, the offset corresponds to the SPS DL-PRS set, each SPS DL-PRS set is configured with one piece of offset information, and there is a need for each SPS DL-PRS set to complete the sending and receiving of all SPS DL-PRSs in the SPS DL-PRS set within the downlink slot indicated by the offset.

Figure 3:
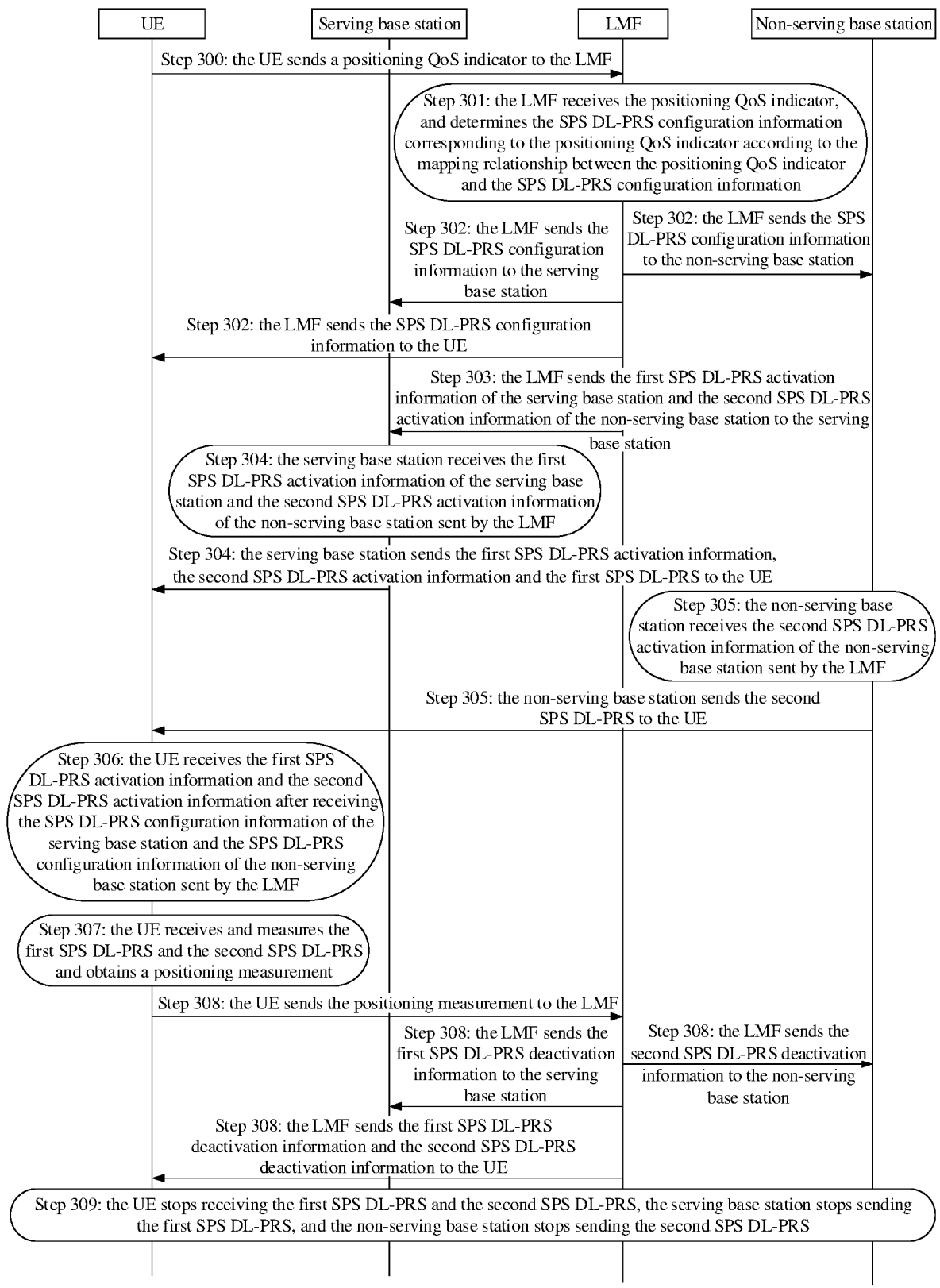
FIG. 3 is a schematic diagram of interaction between devices in the system for receiving and sending the downlink positioning reference signal according to an embodiment of the application.

As shown in FIG. 3, an embodiment of the application further provides a system for receiving and sending a downlink positioning reference signal. The system includes a UE, a serving base station, an LMF and a non-serving base station, wherein the interaction process of the devices is as follows.

Step 300: the UE sends a positioning QoS indicator to the LMf.

Step 301: the LMF receives the positioning QoS indicator, and determines the SPS DL-PRS configuration information corresponding to the positioning QoS indicator according to the mapping relationship between the positioning QoS indicator and the SPS DL-PRS configuration information.

Step 302: the LMF sends the SPS DL-PRS configuration information to the UE, the serving base station and the non-serving base station.

Step 303: the LMF sends the first SPS DL-PRS activation information of the serving base station and the second SPS DL-PRS activation information of the non-serving base station to the serving base station.

Step 304: the serving base station, after receiving the SPS DL-PRS configuration information, receives the first SPS DL-PRS activation information of the serving base station and the second SPS DL-PRS activation information of the non-serving base station sent by the LMF, and sends the first SPS DL-PRS activation information, the second SPS DL-PRS activation information and the first SPS DL-PRS to the UE.

Step 305: the non-serving base station, after receiving the SPS DL-PRS configuration information, receives the second SPS DL-PRS activation information of the non-serving base station sent by the LMF and sends the second SPS DL-PRS to the UE.

Step 306: the UE receives the first SPS DL-PRS activation information and the second SPS DL-PRS activation information after receiving the SPS DL-PRS configuration information of the serving base station and the SPS DL-PRS configuration information of the non-serving base station sent by the LMF.

Step 307: the UE receives and measures the first SPS DL-PRS and the second SPS DL-PRS, and obtains a positioning measurement.

Step 308: the UE sends the positioning measurement to the LMF, and the LMF sends the first SPS DL-PRS deactivation information to the serving base station, sends the second SPS DL-PRS deactivation information to the non-serving base station, and sends the first SPS DL-PRS deactivation information and the second SPS DL-PRS deactivation information to the UE.

Step 309: the UE stops receiving the first SPS DL-PRS and the second SPS DL-PRS, the serving base station stops sending the first SPS DL-PRS, and the non-serving base station stops sending the second SPS DL-PRS.

Figure 4:
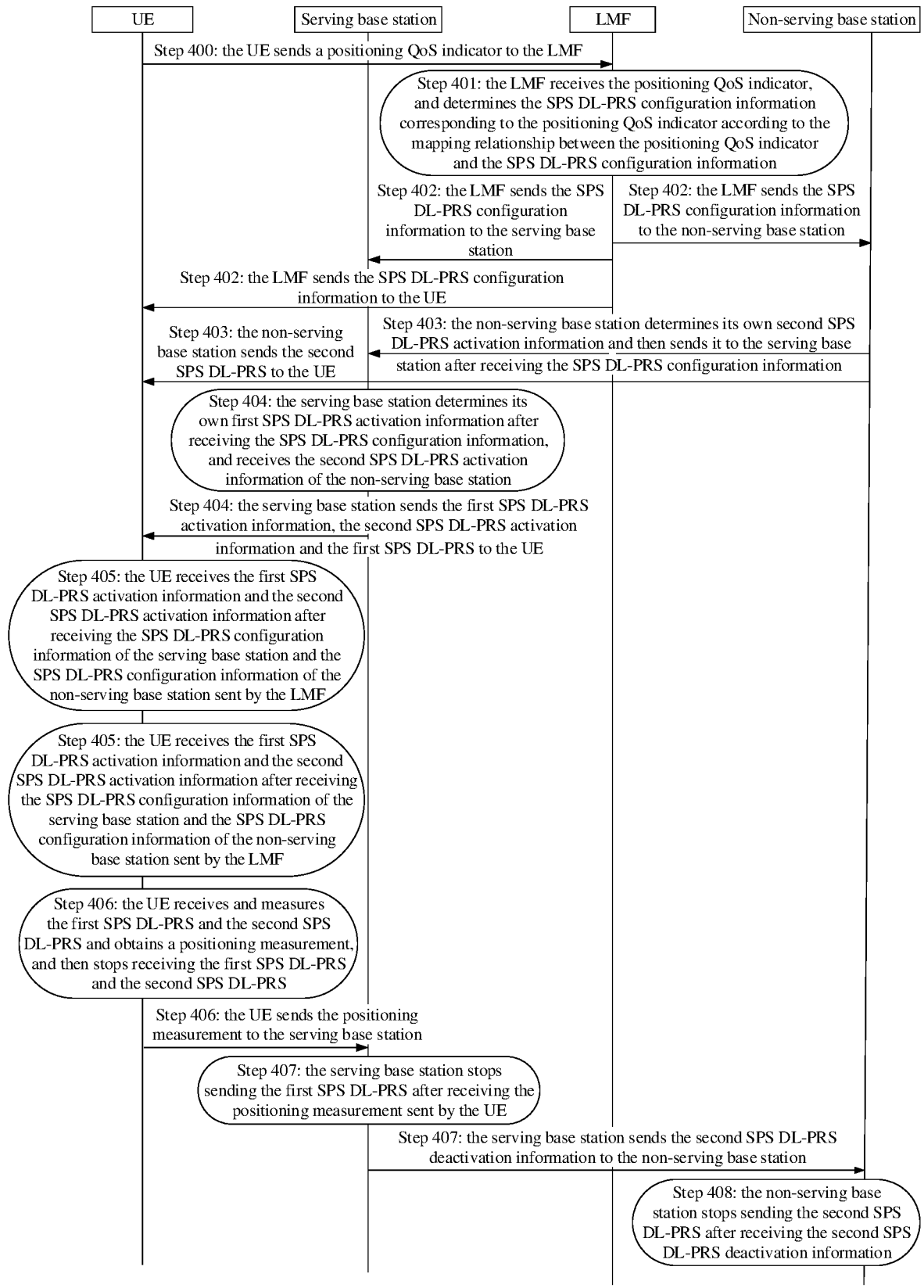
FIG. 4 is a schematic diagram of interaction between devices in the system for receiving and sending the downlink positioning reference signal according to an embodiment of the application.

As shown in FIG. 4, an embodiment of the application further provides a system for receiving and sending a downlink positioning reference signal. The system includes a UE, a serving base station, an LMF and a non-serving base station, wherein the interaction process of the devices is as follows.

Step 400: the UE sends a positioning QoS indicator to the LMF.

Step 401: the LMF receives the positioning QoS indicator, and determines the SPS DL-PRS configuration information corresponding to the positioning QoS indicator according to the mapping relationship between the positioning QoS indicator and the SPS DL-PRS configuration information.

Step 402: the LMF sends the SPS DL-PRS configuration information to the UE, the serving base station and the non-serving base station.

Step 403: the non-serving base station, after receiving the SPS DL-PRS configuration information, determines its own second SPS DL-PRS activation information and then sends it to the serving base station, and sends the second SPS DL-PRS to the UE.

Step 404: the serving base station, after receiving the SPS DL-PRS configuration information, determines its own first SPS DL-PRS activation information, receives the second SPS DL-PRS activation information of the non-serving base station, and sends the first SPS DL-PRS activation information, the second SPS DL-PRS activation information and the first SPS DL-PRS to the UE.

Step 405: the UE receives the first SPS DL-PRS activation information and the second SPS DL-PRS activation information after receiving the SPS DL-PRS configuration information of the serving base station and the SPS DL-PRS configuration information of the non-serving base station sent by the LMF.

Step 406: the UE receives and measures the first SPS DL-PRS and the second SPS DL-PRS, obtains a positioning measurement, and then stops receiving the first SPS DL-PRS and the second SPS DL-PRS, and sends the positioning measurement to the serving base station.

Step 407: the serving base station, after receiving the positioning measurement sent by the UE, stops sending the first SPS DL-PRS, and sends the second SPS DL-PRS deactivation information to the non-serving base station.

Step 408: the non-serving base station stops sending the second SPS DL-PRS after receiving the second SPS DL-PRS deactivation information.

The embodiment of the application provides a method for receiving and sending the downlink positioning reference signal. In this embodiment, the serving base station can obtain the semi-statically configured activation or deactivation information of the downlink positioning reference signal of the serving base station (the first SPS DL-PRS activation information or the first SPS DL-PRS deactivation information) and the semi-statically configured activation or deactivation information of the downlink positioning reference signal of the non-serving base station (the second SPS DL-PRS activation information or the second SPS DL-PRS deactivation information), and then send the first SPS DL-PRS activation information or the first SPS DL-PRS deactivation information and the second SPS DL-PRS activation information or the second SPS DL-PRS deactivation information to the user equipment. Compared with the prior art, the method for sending and receiving the downlink positioning reference signal proposed in the embodiment of the application can activate the SPS DL-PRSs of a serving cell (serving base station/serving Transmission-Reception Point (TRP)) and an adjacent cell (non-serving base station/non-serving TRP). Since the period of the SPS DL-PRS is usually less than the period of the periodic PRS, the positioning delay can be reduced, and the transmission of the SPS DL-PRS can be ended in advance through SPS deactivation, so that the positioning process can be completed with the relatively small overhead of the reference signal, and the system spectrum efficiency is improved. The cell, TRP and base station are equivalent concepts in the embodiments of the application.

Embodiment 2: based on the same inventive concept, this embodiment of the application further provides a user equipment. Since this terminal is a terminal corresponding to the method of the embodiment of the application and the principle of this terminal to solve the problem is similar to that of the method, the implementations of this terminal can refer to the implementations of the method, and the repeated description thereof will be omitted here.

Figure 5:
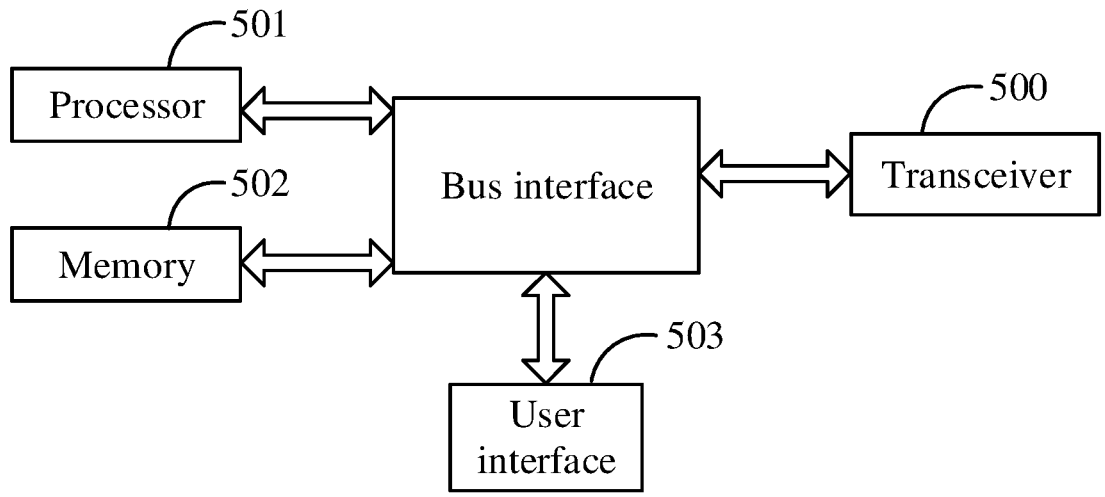
FIG. 5 is a schematic diagram of a user equipment according to an embodiment of the application.

As shown in FIG. 5, this embodiment of the application further provides a user equipment, including a memory 502, a transceiver 500 and a processor 501:

the memory 502 is configured to store a computer program; the transceiver 500 is configured to send and receive data under the control of the processor 501; and the processor 501 is configured to read the computer program in the memory 502 and perform the following steps:

receiving SPS DL-PRS activation information of a plurality of base stations after receiving SPS DL-PRS configuration information of the plurality of base stations configured by an LMF through SPS; where the base stations include a serving base station and a non-serving base station;

receiving and measuring an SPS DL-PRS according to a period and time-frequency resource information of the SPS DL-PRS determined from the SPS DL-PRS configuration information and according to a downlink slot of the SPS DL-PRS determined from the SPS DL-PRS activation information, and obtaining a positioning measurement;

sending the positioning measurement to the LMF or the serving base station of the UE, to notify a base station corresponding to the SPS DL-PRS activation information to stop sending the SPS DL-PRS.

Here, in FIG. 5, the bus architecture may include any numbers of interconnected buses and bridges, and specifically link various circuits of one or more processors represented by the processor 501 and the memory represented by the memory 502. The bus architecture may further link various other circuits such as peripheral device, voltage regulator and power management circuit, which are all well known in the art and thus will not be further described again herein. The bus interface provides an interface. The transceiver 500 may be a plurality of elements, i.e., include a transmitter and a receiver, and provide the units for communicating with various other devices over the transmission media, including wireless channel, wired channel, optical cable, etc. For different user equipments, the user interface 503 may also be the interface capable of inter-connecting or exter-connecting with the required devices, and the connected devices include but not limited to keypad, display, loudspeaker, microphone, joystick and the like.

The processor 501 is responsible for managing the bus architecture and general processing, and the memory 502 may store the data used by the processor 501 when performing the operations.

Optionally, the processor 501 may be CPU (Central Processing Unit), ASIC (Application Specific Integrated Circuit), FPGA (Field-Programmable Gate Array) or CPLD (Complex Programmable Logic Device), and the processor may also use a multi-core architecture.

The processor is configured to execute any one of the methods provided in the embodiments of the application according to the obtained executable instructions by invoking the computer program stored in the memory. The processor and memory may also be physically separated.

As an optional embodiment, the processor 501 is further configured to perform:

stopping receiving the SPS DL-PRS; or stopping receiving an SPS DL-PRS corresponding to SPS DL-PRS deactivation information of at least one base station, in response to receiving the SPS DL-PRS deactivation information.

As an optional embodiment, the processor 501 is further configured to perform:

sending SPS DL-PRS deactivation information of at least one base station, to notify the base station corresponding to the SPS DL-PRS deactivation information to stop sending the SPS DL-PRS.

As an optional embodiment, the processor 501 is specifically configured to perform:

sending the positioning measurement to the base station corresponding to the SPS DL-PRS activation information through the LMF; or sending the positioning measurement to the serving base station, includes:

sending the positioning measurement to the serving base station, so that the serving base station stops sending the SPS DL-PRS signal based on the positioning measurement and notifies the non-serving base station to stop sending the SPS DL-PRS signal.

As an optional embodiment, the processor 501 is further configured to perform:

sending a positioning QoS indicator of the UE to the LMF, to notify the LMF to determine the SPS DL-PRS configuration information corresponding to the positioning QoS indicator according to the positioning QoS indicator.

As an optional embodiment, the processor 501 is specifically configured to perform:

receiving the SPS DL-PRS configuration information of the plurality of base stations from the LMF by the SPS configuration via LLP signaling or RRC signaling; and/or the receiving the SPS DL-PRS activation information of the plurality of base stations, includes:

receiving the SPS DL-PRS activation information of the plurality of base stations through DCI signaling or MAC-CE signaling.

As an optional embodiment, the processor 501 is specifically configured to perform:

determining activation information according to an activation field in the DCI signaling, after determining that the activation information is the SPS DL-PRS activation information according to a newly added field in the received DCI signaling.

As an optional embodiment, the SPS DL-PRS activation information includes: first SPS DL-PRS activation information of the serving base station and second SPS DL-PRS activation information of the non-serving base station; the processor 501 is further configured to perform:

determining the first SPS DL-PRS activation information according to a first field in a received signaling and the second SPS DL-PRS activation information according to a second field in the signaling; or determining the first SPS DL-PRS activation information through a field in a first signaling after determining the corresponding serving base station according to an index indication field in the first signaling; and determining the second SPS DL-PRS activation information through a field in a second signaling after determining the corresponding non-serving base station according to an index indication field in the second signaling.

It should be noted here that the above-mentioned apparatus provided in this embodiment of the application can implement all the method steps implemented in the above-mentioned method embodiment and can achieve the same technical effects. The parts and beneficial effects in this embodiment same as those in the method embodiment will not be described here in detail.

Embodiment 3: based on the same inventive concept, this embodiment of the application further provides a serving base station. Since this base station is a base station corresponding to the method of the embodiment of the application and the principle of this base station to solve the problem is similar to that of the method, the implementations of this base station can refer to the implementations of the method, and the repeated description thereof will be omitted here.

Figure 6:
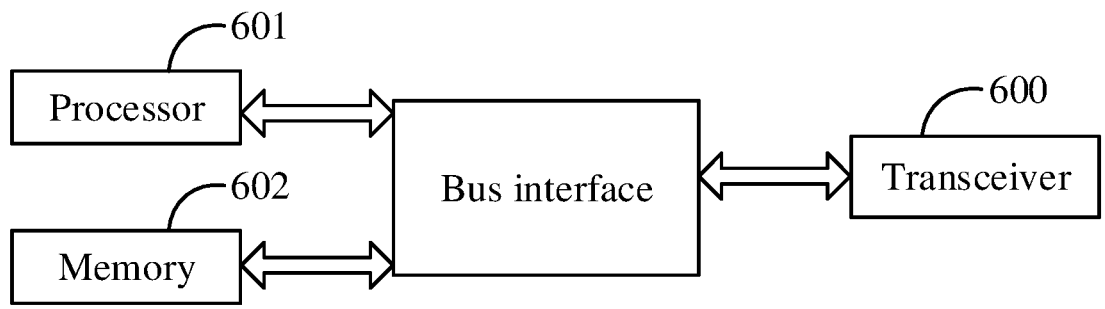
FIG. 6 is a schematic diagram of a serving base station according to an embodiment of the application.

As shown in FIG. 6, this embodiment of the application further provides a serving base station, including a memory 602, a transceiver 600 and a processor 601:

the memory 602 is configured to store a computer program; the transceiver is configured to send and receive data under the control of the processor 601; and the processor 601 is configured to read the computer program in the memory 602 and perform the following steps:

determining SPS DL-PRS activation information of a plurality of base stations including the serving base station and a non-serving base station, after receiving SPS DL-PRS configuration information of the serving base station configured by an LMF through SPS;

sending the SPS DL-PRS activation information of the plurality of base stations to a UE, and sending an SPS DL-PRS to the UE according to a period of the SPS DL-PRS determined from the SPS DL-PRS configuration information of the serving base station and a downlink slot of the SPS DL-PRS determined from SPS DL-PRS activation information of the serving base station;

stopping sending the SPS DL-PRS in response to receiving a positioning measurement or SPS DL-PRS deactivation information of the serving base station.

Here, in FIG. 6, the bus architecture may include any numbers of interconnected buses and bridges, and specifically link various circuits of one or more processors represented by the processor 601 and the memory represented by the memory 602. The bus architecture may further link various other circuits such as peripheral device, voltage regulator and power management circuit, which are all well known in the art and thus will not be further described again herein. The bus interface provides an interface. The transceiver 600 may be a plurality of elements, i.e., include a transmitter and a receiver, and provide the units for communicating with various other devices over the transmission media, including wireless channel, wired channel, optical cable, etc. The processor 601 is responsible for managing the bus architecture and general processing, and the memory 602 may store the data used by the processor 601 when performing the operations.

The processor 601 may be Central Processing Unit (CPU), Application Specific Integrated Circuit (ASIC), Field-Programmable Gate Array (FPGA) or Complex Programmable Logic Device (CPLD), and the processor may also use a multi-core architecture.

As an optional embodiment, the SPS DL-PRS activation information includes: first SPS DL-PRS activation information of the serving base station and second SPS DL-PRS activation information of the non-serving base station; the processor 601 is specifically configured to perform:

receiving the first SPS DL-PRS activation information through the LMF, or determining the first SPS DL-PRS activation information by itself;

receiving the second SPS DL-PRS activation information through the LMF or an Xn interface between base stations.

As an optional embodiment, the processor 601 is specifically configured to perform:

receiving the SPS DL-PRS configuration information of the serving base station from the LMF by the SPS configuration via LLP signaling or RRC signaling; and/or sending the SPS DL-PRS activation information of the plurality of base stations to the UE, includes:

sending the SPS DL-PRS activation information of the plurality of base stations through DCI signaling or MAC-CE signaling.

As an optional embodiment, the processor 601 is specifically configured to perform:

determining activation information according to an activation field in the DCI signaling, after determining that the activation information is the SPS DL-PRS activation information according to a newly added field in the sent DCI signaling.

As an optional embodiment, the SPS DL-PRS activation information includes: first SPS DL-PRS activation information of the serving base station and second SPS DL-PRS activation information of the non-serving base station; the processor 601 is specifically configured to perform:

determining the first SPS DL-PRS activation information according to a first field in a sent signaling and the second SPS DL-PRS activation information according to a second field in the signaling; or determining the first SPS DL-PRS activation information through a field in a first signaling after determining the corresponding serving base station according to an index indication field in the first signaling; and determining the second SPS DL-PRS activation information through a field in a second signaling after determining the corresponding non-serving base station according to an index indication field in the second signaling.

As an optional embodiment, the processor 601 is further configured to perform:

notifying the non-serving base station to stop sending an SPS DL-PRS, or sending SPS DL-PRS deactivation information of the non-serving base station to the UE, after receiving the SPS DL-PRS deactivation information of the non-serving base station.

As an optional embodiment, the processor 601 is further configured to perform:

sending the SPS DL-PRS deactivation information of the serving base station to the UE.

As an optional embodiment, the processor 601 is specifically configured to perform:

sending the SPS DL-PRS deactivation information of the non-serving base station to the UE through DCI signaling or MAC CE signaling; and/or sending the SPS DL-PRS deactivation information of the serving base station to the UE through DCI signaling or MAC CE signaling.

It should be noted here that the above-mentioned apparatus provided in this embodiment of the application can implement all the method steps implemented in the above-mentioned method embodiment and can achieve the same technical effects. The parts and beneficial effects in this embodiment same as those in the method embodiment will not be described here in detail.

Embodiment 4: based on the same inventive concept, this embodiment of the application further provides a network device. Since this device is a device corresponding to the method of the embodiment of the application and the principle of this network device to solve the problem is similar to that of the method, the implementations of this device can refer to the implementations of the method, and the repeated description thereof will be omitted here.

Figure 7:
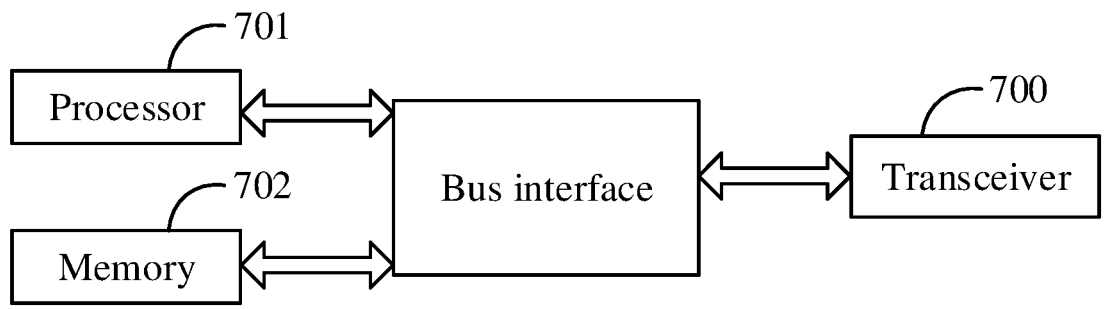
FIG. 7 is a schematic diagram of a network device according to an embodiment of the application.

As shown in FIG. 7, this embodiment of the application further provides a network device, applied to an LMF, including a memory 702, a transceiver 700 and a processor 701:

the memory 702 is configured to store a computer program; the transceiver 700 is configured to send and receive data under the control of the processor 701; and the processor 701 is configured to read the computer program in the memory 702 and perform the following steps:

determining SPS DL-PRS configuration information of a UE configured through SPS, and sending the SPS DL-PRS configuration information to the UE and a plurality of base stations including a serving base station and a non-serving base station of the UE, after receiving a positioning request sent by the UE;

if the LMF receives a positioning measurement of the UE: sending SPS DL-PRS deactivation information to the UE, to notify the UE to stop receiving an SPS DL-PRS according to a period and time-frequency resource information of the SPS DL-PRS determined from the SPS DL-PRS configuration information and according to a downlink slot of the SPS DL-PRS determined from the SPS DL-PRS deactivation information; and/or, sending the SPS DL-PRS deactivation information to the plurality of base stations, to notify the plurality of base stations to stop sending the SPS DL-PRS according to a period and time-frequency resource information of the SPS DL-PRS determined from the SPS DL-PRS configuration information and according to a downlink slot of the SPS DL-PRS determined from the SPS DL-PRS deactivation information.

Here, in FIG. 7, the bus architecture may include any numbers of interconnected buses and bridges, and specifically link various circuits of one or more processors represented by the processor 701 and the memory represented by the memory 702. The bus architecture may further link various other circuits such as peripheral device, voltage regulator and power management circuit, which are all well known in the art and thus will not be further described again herein. The bus interface provides an interface. The transceiver 700 may be a plurality of elements, i.e., include a transmitter and a receiver, and provide the units for communicating with various other devices over the transmission media, including wireless channel, wired channel, optical cable, etc. The processor 701 is responsible for managing the bus architecture and general processing, and the memory 702 may store the data used by the processor 701 when performing the operations.

The processor 701 may be Central Processing Unit (CPU), Application Specific Integrated Circuit (ASIC), Field-Programmable Gate Array (FPGA) or Complex Programmable Logic Device (CPLD), and the processor may also use a multi-core architecture.

As an optional embodiment, the processor 701 is specifically configured to perform:

after receiving a positioning request carrying a positioning QoS indicator sent by the UE, determining the SPS DL-PRS configuration information corresponding to the positioning QoS indicator according to a mapping relationship between the positioning QoS indicator and the SPS DL-PRS configuration information.

As an optional embodiment, after sending the SPS DL-PRS configuration information to the plurality of base stations including the serving base station of the UE, the processor 701 is further configured to perform:

determining SPS DL-PRS activation information of at least one base station, and sending the SPS DL-PRS activation information to the serving base station; and/or sending SPS DL-PRS activation information of at least one non-serving base station to the serving base station after receiving the SPS DL-PRS activation information.

As an optional embodiment, the processor 701 is further configured to perform:

sending SPS DL-PRS deactivation information of at least one base station to the at least one base station in response to receiving the SPS DL-PRS deactivation information sent by the UE.

It should be noted here that the above-mentioned apparatus provided in this embodiment of the application can implement all the method steps implemented in the above-mentioned method embodiment and can achieve the same technical effects. The parts and beneficial effects in this embodiment same as those in the method embodiment will not be described here in detail.

Embodiment 5: based on the same inventive concept, this embodiment of the application further provides a non-serving base station. Since this base station is a base station corresponding to the method of the embodiment of the application and the principle of this base station to solve the problem is similar to that of the method, the implementations of this base station can refer to the implementations of the method, and the repeated description thereof will be omitted here.

Figure 8:
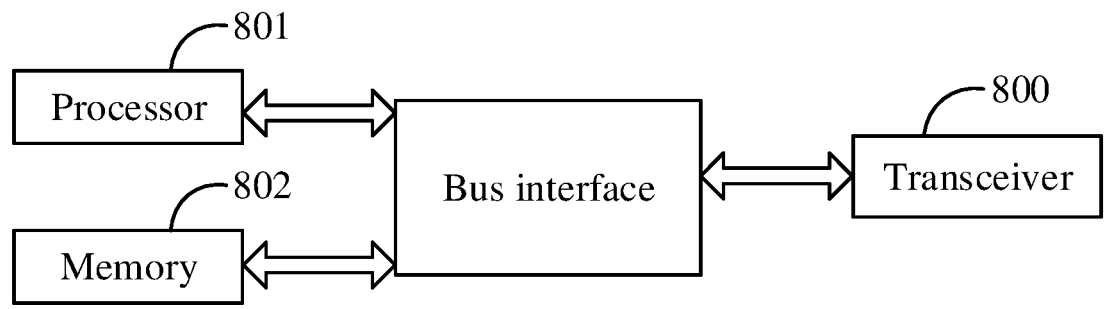
FIG. 8 is a schematic diagram of a non-serving base station according to an embodiment of the application.

As shown in FIG. 8, this embodiment of the application further provides a non-serving base station, including a memory 802, a transceiver 800 and a processor 801:

the memory 802 is configured to store a computer program; the transceiver 800 is configured to send and receive data under the control of the processor 801; and the processor 801 is configured to read the computer program in the memory 802 and perform the following steps:

determining SPS DL-PRS activation information of the non-serving base station after receiving SPS DL-PRS configuration information of the non-serving base station configured by an LMF through SPS;

sending an SPS DL-PRS to a UE according to a period and time-frequency resource information of the SPS DL-PRS determined from the SPS DL-PRS configuration information of the non-serving base station and a downlink slot of the SPS DL-PRS determined from the SPS DL-PRS activation information of the non-serving base station;

stopping sending the SPS DL-PRS in response to receiving SPS DL-PRS deactivation information of the non-serving base station forwarded by the LMF or a serving base station of the UE.

Here, in FIG. 8, the bus architecture may include any numbers of interconnected buses and bridges, and specifically link various circuits of one or more processors represented by the processor 801 and the memory represented by the memory 802. The bus architecture may further link various other circuits such as peripheral device, voltage regulator and power management circuit, which are all well known in the art and thus will not be further described again herein. The bus interface provides an interface. The transceiver 800 may be a plurality of elements, i.e., include a transmitter and a receiver, and provide the units for communicating with various other devices over the transmission media, including wireless channel, wired channel, optical cable, etc. The processor 801 is responsible for managing the bus architecture and general processing, and the memory 802 may store the data used by the processor 801 when performing the operations.

The processor 801 may be Central Processing Unit (CPU), Application Specific Integrated Circuit (ASIC), Field-Programmable Gate Array (FPGA) or Complex Programmable Logic Device (CPLD), and the processor may also use a multi-core architecture.

As an optional embodiment, the processor 801 is specifically configured to perform:
receiving the SPS DL-PRS activation information through the LMF, or determining the SPS DL-PRS activation information by itself.

As an optional embodiment, the processor 801 is specifically further configured to perform:
sending the SPS DL-PRS activation information to the serving base station through the LMF or an Xn interface between base stations.

It should be noted here that the above-mentioned apparatus provided in this embodiment of the application can implement all the method steps implemented in the above-mentioned method embodiment and can achieve the same technical effects. The parts and beneficial effects in this embodiment same as those in the method embodiment will not be described here in detail.

Embodiment 6: based on the same inventive concept, this embodiment of the application further provides an apparatus for receiving a downlink positioning reference signal. Since this apparatus is an apparatus corresponding to the method of the embodiment of the application and the principle of this apparatus to solve the problem is similar to that of the method, the implementations of this apparatus can refer to the implementations of the method, and the repeated description thereof will be omitted here.

It should be noted that the division of units in the embodiments of the application is illustrative, and is merely a kind of logical function division, and there may be other division methods in actual implementations. In addition, the functional units in each embodiment of the application may be integrated into one processing unit, or each unit may exist alone physically, or two or more units may be integrated into one unit. The above-mentioned integrated units can be implemented in the form of hardware, or can be implemented in the form of software functional units.

When the integrated unit is implemented in the form of software functional unit and sold or used as an independent product, it may be stored in a processor readable storage medium. Based on such understanding, the technical solution of the application essentially or a part that contributes to the prior art or all or a part of the technical solution may be embodied in the form of software product. The computer software product is stored in a storage medium, and includes several instructions used to enable a computer device (which may be a personal computer, server, or network device, etc.) or a processor to perform all or some of the steps of the methods of various embodiments of the application. The above-mentioned storage medium includes: USB flash drive, mobile hard disk, Read-Only Memory (ROM), Random Access Memory (RAM), magnetic disk or compact disc or various media that can store the program codes.

Figure 9:
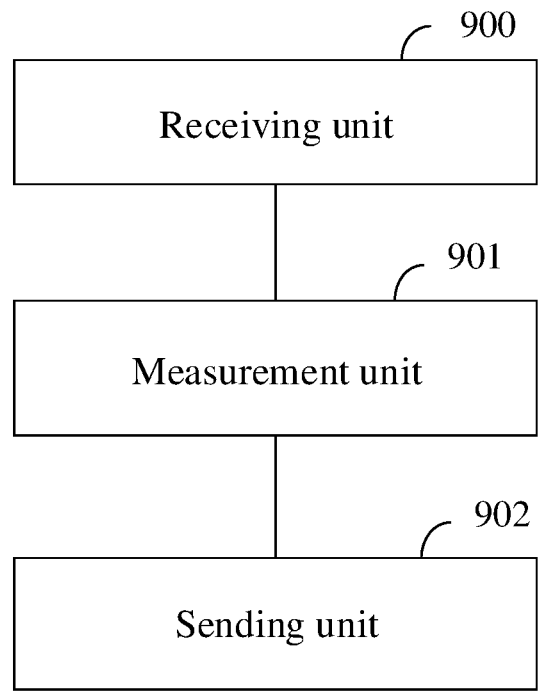
FIG. 9 is a schematic diagram of an apparatus for receiving a downlink positioning reference signal according to an embodiment of the application.

As shown in FIG. 9, this apparatus includes:
a receiving unit 900 configured for a UE to receive SPS DL-PRS activation information of a plurality of base stations after receiving SPS DL-PRS configuration information of the plurality of base stations configured by an LMF through SPS; where the base stations include a serving base station and a non-serving base station;
a measurement unit 901 configured for the UE to receive and measure an SPS DL-PRS according to a period and time-frequency resource information of the SPS DL-PRS determined from the SPS DL-PRS configuration information and according to a downlink slot of the SPS DL-PRS determined from the SPS DL-PRS activation information, and obtain a positioning measurement;
a sending unit 902 configured for the UE to send the positioning measurement to the LMF or the serving base station, to notify a base station corresponding to the SPS DL-PRS activation information to stop sending the SPS DL-PRS.

As an optional embodiment, the sending unit is further configured to:
stop receiving the SPS DL-PRS; or
stop receiving an SPS DL-PRS corresponding to SPS DL-PRS deactivation information of at least one base station in response to receiving the SPS DL-PRS deactivation information.

As an optional embodiment, the measurement unit is further configured to:
send SPS DL-PRS deactivation information of at least one base station, to notify the base station corresponding to the SPS DL-PRS deactivation information to stop sending the SPS DL-PRS.

As an optional embodiment, the sending unit is specifically configured to:
send the positioning measurement to the base station corresponding to the SPS DL-PRS activation information through the LMF; or
send the positioning measurement to the serving base station, so that the serving base station stops sending the SPS DL-PRS signal based on the positioning measurement and notifies the non-serving base station to stop sending the SPS DL-PRS signal.

As an optional embodiment, the receiving unit is further configured to:
send a positioning QoS indicator of the UE to the LMF, to notify the LMF to determine the SPS DL-PRS configuration information corresponding to the positioning QoS indicator according to the positioning QoS indicator.

As an optional embodiment, the receiving unit is specifically configured to:
receive the SPS DL-PRS configuration information of the plurality of base stations from the LMF by the SPS configuration via LLP signaling or RRC signaling; and/or
the receiving the SPS DL-PRS activation information of the plurality of base stations, includes:
receiving the SPS DL-PRS activation information of the plurality of base stations through DCI signaling or MAC-CE signaling.

As an optional embodiment, the receiving unit is specifically configured to: determine activation information according to an activation field in the DCI signaling after the UE determines that the activation information is the SPS DL-PRS activation information according to a newly added field in the received DCI signaling.

As an optional embodiment, the SPS DL-PRS activation information includes: first SPS DL-PRS activation information of the serving base station and second SPS DL-PRS activation information of the non-serving base station; the receiving unit is specifically configured to:
- determine the first SPS DL-PRS activation information according to a first field in a received signaling and the second SPS DL-PRS activation information according to a second field in the signaling; or
- determine the first SPS DL-PRS activation information through a field in a received first signaling after determining the corresponding serving base station according to an index indication field in the first signaling; and determine the second SPS DL-PRS activation information through a field in a received second signaling after determining the corresponding non-serving base station according to an index indication field in the second signaling.

It should be noted here that the above-mentioned apparatus provided in this embodiment of the application can implement all the method steps implemented in the above-mentioned method embodiment and can achieve the same technical effects. The parts and beneficial effects in this embodiment same as those in the method embodiment will not be described here in detail.

Embodiment 7: based on the same inventive concept, this embodiment of the application further provides a first apparatus for sending a downlink positioning reference signal. Since this apparatus is an apparatus corresponding to the method of the embodiment of the application and the principle of this apparatus to solve the problem is similar to that of the method, the implementations of this apparatus can refer to the implementations of the method, and the repeated description thereof will be omitted here.

It should be noted that the division of units in the embodiments of the application is illustrative, and is merely a kind of logical function division, and there may be other division methods in actual implementations. In addition, the functional units in each embodiment of the application may be integrated into one processing unit, or each unit may exist alone physically, or two or more units may be integrated into one unit. The above-mentioned integrated units can be implemented in the form of hardware, or can be implemented in the form of software functional units.

When the integrated unit is implemented in the form of software functional unit and sold or used as an independent product, it may be stored in a processor readable storage medium. Based on such understanding, the technical solution of the application essentially or a part that contributes to the prior art or all or a part of the technical solution may be embodied in the form of software product. The computer software product is stored in a storage medium, and includes several instructions used to enable a computer device (which may be a personal computer, server, or network device, etc.) or a processor to perform all or some of the steps of the methods of various embodiments of the application. The above-mentioned storage medium includes: USB flash drive, mobile hard disk, Read-Only Memory (ROM), Random Access Memory (RAM), magnetic disk or compact disc or various media that can store the program codes.

Figure 10:
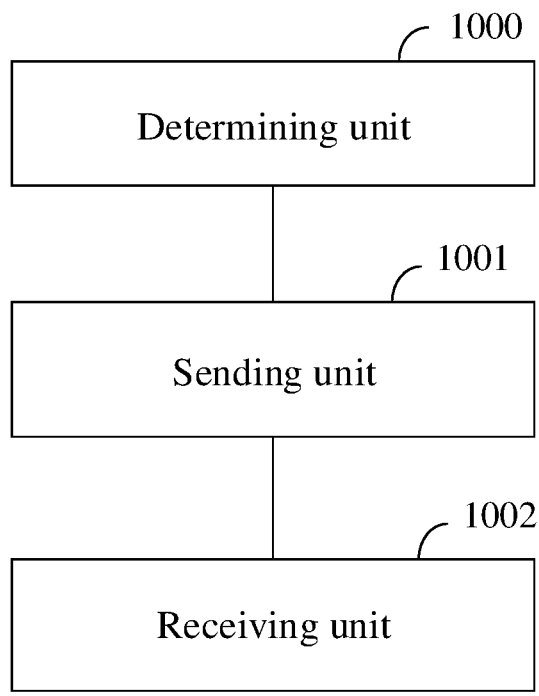
FIG. 10 is a schematic diagram of a first apparatus for sending a downlink positioning reference signal according to an embodiment of the application.

As shown in FIG. 10, this apparatus includes:
- a determining unit 1000 configured for a serving base station to determine SPS DL-PRS activation information of a plurality of base stations including the serving base station and a non-serving base station after receiving SPS DL-PRS configuration information of the serving base station configured by an LMF through SPS;
- a sending unit 1001 configured for the serving base station to send the SPS DL-PRS activation information of the plurality of base stations to a UE, and send an SPS DL-PRS to the UE according to a period of the SPS DL-PRS determined from the SPS DL-PRS configuration information of the serving base station and a downlink slot of the SPS DL-PRS determined from SPS DL-PRS activation information of the serving base station;
- a receiving unit 1002 configured for the serving base station to stop sending the SPS DL-PRS after receiving a positioning measurement or SPS DL-PRS deactivation information of the serving base station.

As an optional embodiment, the SPS DL-PRS activation information includes: first SPS DL-PRS activation information of the serving base station and second SPS DL-PRS activation information of the non-serving base station; the determining unit is specifically configured to:
- receive the first SPS DL-PRS activation information through the LMF, or determine the first SPS DL-PRS activation information by itself;
- receive the second SPS DL-PRS activation information through the LMF or an Xn interface between base stations.

As an optional embodiment, the determining unit is specifically configured to:
- receive the SPS DL-PRS configuration information of the serving base station from the LMF by the SPS configuration via LLP signaling or RRC signaling; and/or
- sending the SPS DL-PRS activation information of the plurality of base stations to the UE, includes:
- sending, by the serving base station, the SPS DL-PRS activation information of the plurality of base stations through DCI signaling or MAC-CE signaling.

As an optional embodiment, the sending unit is specifically configured to:
- determine activation information according to an activation field in the DCI signaling after determining that the activation information is the SPS DL-PRS activation information according to a newly added field in the sent DCI signaling.

As an optional embodiment, the SPS DL-PRS activation information includes: first SPS DL-PRS activation information of the serving base station and second SPS DL-PRS activation information of the non-serving base station; the sending unit is specifically configured to:
- determine the first SPS DL-PRS activation information according to a first field in a sent signaling and the second SPS DL-PRS activation information according to a second field in the signaling; or
- determine the first SPS DL-PRS activation information through a field in a sent first signaling after determining the corresponding serving base station according to an index indication field in the first signaling; and determine the second SPS DL-PRS activation information through a field in a sent second signaling after determining the corresponding non-serving base station according to an index indication field in the second signaling.

As an optional embodiment, the apparatus further includes a deactivation unit configured to:
- notify the non-serving base station to stop sending an SPS DL-PRS, or send SPS DL-PRS deactivation information of the non-serving base station to the UE, after receiving the SPS DL-PRS deactivation information of the non-serving base station.

As an optional embodiment, the receiving unit is specifically further configured to:

send the SPS DL-PRS deactivation information of the serving base station to the UE.

As an optional embodiment, the sending unit is specifically configured to:

send the SPS DL-PRS deactivation information of the non-serving base station to the UE through DCI signaling or MAC CE signaling; and/or sending the SPS DL-PRS deactivation information of the serving base station to the UE, includes:

sending the SPS DL-PRS deactivation information of the serving base station to the UE through DCI signaling or MAC CE signaling.

It should be noted here that the above-mentioned apparatus provided in this embodiment of the application can implement all the method steps implemented in the above-mentioned method embodiment and can achieve the same technical effects. The parts and beneficial effects in this embodiment same as those in the method embodiment will not be described here in detail.

Embodiment 8: based on the same inventive concept, this embodiment of the application further provides a second apparatus for sending a downlink positioning reference signal. Since this apparatus is an apparatus corresponding to the method of the embodiment of the application and the principle of this apparatus to solve the problem is similar to that of the method, the implementations of this apparatus can refer to the implementations of the method, and the repeated description thereof will be omitted here.

It should be noted that the division of units in the embodiments of the application is illustrative, and is merely a kind of logical function division, and there may be other division methods in actual implementations. In addition, the functional units in each embodiment of the application may be integrated into one processing unit, or each unit may exist alone physically, or two or more units may be integrated into one unit. The above-mentioned integrated units can be implemented in the form of hardware, or can be implemented in the form of software functional units.

When the integrated unit is implemented in the form of software functional unit and sold or used as an independent product, it may be stored in a processor readable storage medium. Based on such understanding, the technical solution of the application essentially or a part that contributes to the prior art or all or a part of the technical solution may be embodied in the form of software product. The computer software product is stored in a storage medium, and includes several instructions used to enable a computer device (which may be a personal computer, server, or network device, etc.) or a processor to perform all or some of the steps of the methods of various embodiments of the application. The above-mentioned storage medium includes: USB flash drive, mobile hard disk, Read-Only Memory (ROM), Random Access Memory (RAM), magnetic disk or compact disc or various media that can store the program codes.

Figure 11:
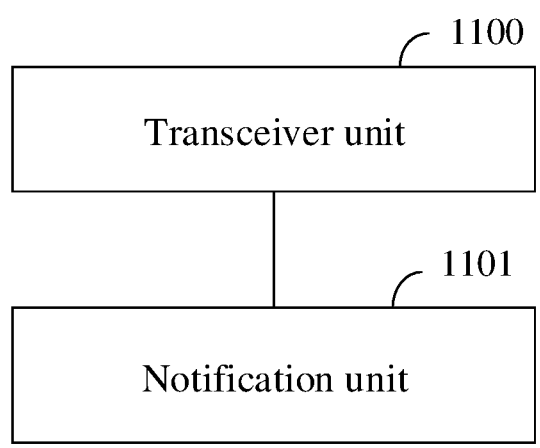
FIG. 11 is a schematic diagram of a second apparatus for sending a downlink positioning reference signal according to an embodiment of the application.

As shown in FIG. 11, this apparatus includes:

a transceiver unit 1100 configured for an LMF to determine SPS DL-PRS configuration information of a UE configured through SPS, and send the SPS DL-PRS configuration information to the UE and a plurality of base stations including a serving base station and a non-serving base station of the UE, after receiving a positioning request sent by the UE;

a notification unit 1101 configured to: if the LMF receives a positioning measurement of the UE, send SPS DL-PRS deactivation information to the UE, to notify the UE to stop receiving an SPS DL-PRS according to a period and time-frequency resource information of the SPS DL-PRS determined from the SPS DL-PRS configuration information and according to a downlink slot of the SPS DL-PRS determined from the SPS DL-PRS deactivation information; and/or, send the SPS DL-PRS deactivation information to the plurality of base stations, to notify the plurality of base stations to stop sending the SPS DL-PRS according to a period and time-frequency resource information of the SPS DL-PRS determined from the SPS DL-PRS configuration information and according to a downlink slot of the SPS DL-PRS determined from the SPS DL-PRS deactivation information.

As an optional embodiment, the transceiver unit is specifically configured to:

determine the SPS DL-PRS configuration information corresponding to a positioning QoS indicator according to a mapping relationship between the positioning QoS indicator and the SPS DL-PRS configuration information after receiving the positioning request carrying the positioning QoS indicator sent by the UE.

As an optional embodiment, the transceiver unit is specifically further configured to:

determine SPS DL-PRS activation information of at least one base station, and send the SPS DL-PRS activation information to the serving base station; and/or send SPS DL-PRS activation information of at least one non-serving base station to the serving base station after receiving the SPS DL-PRS activation information.

As an optional embodiment, the apparatus further includes a deactivation unit configured to:

send SPS DL-PRS deactivation information of at least one base station to the at least one base station if the LMF receives the SPS DL-PRS deactivation information sent by the UE.

It should be noted here that the above-mentioned apparatus provided in this embodiment of the application can implement all the method steps implemented in the above-mentioned method embodiment and can achieve the same technical effects. The parts and beneficial effects in this embodiment same as those in the method embodiment will not be described here in detail.

Embodiment 9: based on the same inventive concept, this embodiment of the application further provides a third apparatus for sending a downlink positioning reference signal. Since this apparatus is an apparatus corresponding to the method of the embodiment of the application and the principle of this apparatus to solve the problem is similar to that of the method, the implementations of this apparatus can refer to the implementations of the method, and the repeated description thereof will be omitted here.

It should be noted that the division of units in the embodiments of the application is illustrative, and is merely a kind of logical function division, and there may be other division methods in actual implementations. In addition, the functional units in each embodiment of the application may be integrated into one processing unit, or each unit may exist alone physically, or two or more units may be integrated into one unit. The above-mentioned integrated units can be implemented in the form of hardware, or can be implemented in the form of software functional units.

When the integrated unit is implemented in the form of software functional unit and sold or used as an independent product, it may be stored in a processor readable storage medium. Based on such understanding, the technical solution of the application essentially or a part that contributes to the prior art or all or a part of the technical solution may be embodied in the form of software product. The computer software product is stored in a storage medium, and includes several instructions used to enable a computer device (which may be a personal computer, server, or network device, etc.) or a processor to perform all or some of the steps of the methods of various embodiments of the application. The above-mentioned storage medium includes: USB flash drive, mobile hard disk, Read-Only Memory (ROM), Random Access Memory (RAM), magnetic disk or compact disc or various media that can store the program codes.

Figure 12:
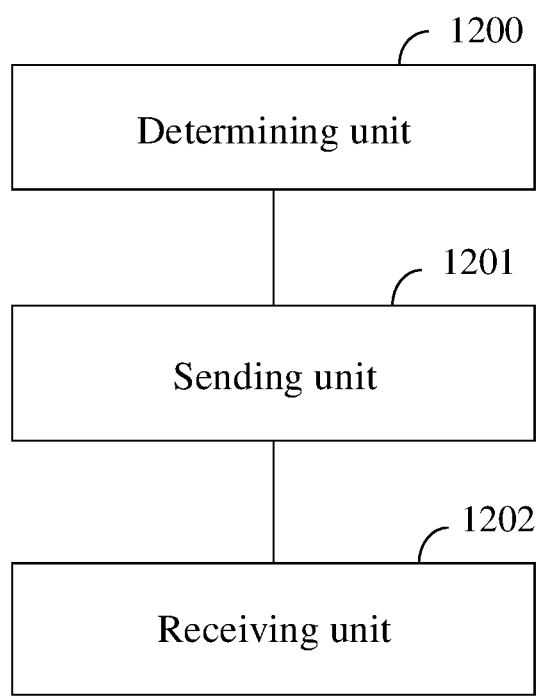
FIG. 12 is a schematic diagram of a third apparatus for sending a downlink positioning reference signal according to an embodiment of the application.

As shown in FIG. 12, this apparatus includes:
- a determining unit 1200 configured for a non-serving base station to determine SPS DL-PRS activation information of the non-serving base station after receiving SPS DL-PRS configuration information of the non-serving base station configured by an LMF through SPS;
- a sending unit 1201 configured for the non-serving base station to send an SPS DL-PRS to a UE according to a period and time-frequency resource information of the SPS DL-PRS determined from the SPS DL-PRS configuration information of the non-serving base station and a downlink slot of the SPS DL-PRS determined from the SPS DL-PRS activation information of the non-serving base station;
- a receiving unit 1202 configured for the non-serving base station to stop sending the SPS DL-PRS after receiving SPS DL-PRS deactivation information of the non-serving base station forwarded by the LMF or a serving base station of the UE.

As an optional embodiment, the determining unit is specifically configured to:
receive the SPS DL-PRS activation information through the LMF, or determine the SPS DL-PRS activation information by itself.

As an optional embodiment, the determining unit is specifically further configured to:
send the SPS DL-PRS activation information to the serving base station through the LMF or an Xn interface between base stations.

It should be noted here that the above-mentioned apparatus provided in this embodiment of the application can implement all the method steps implemented in the above-mentioned method embodiment and can achieve the same technical effects. The parts and beneficial effects in this embodiment same as those in the method embodiment will not be described here in detail.

Figure 13:
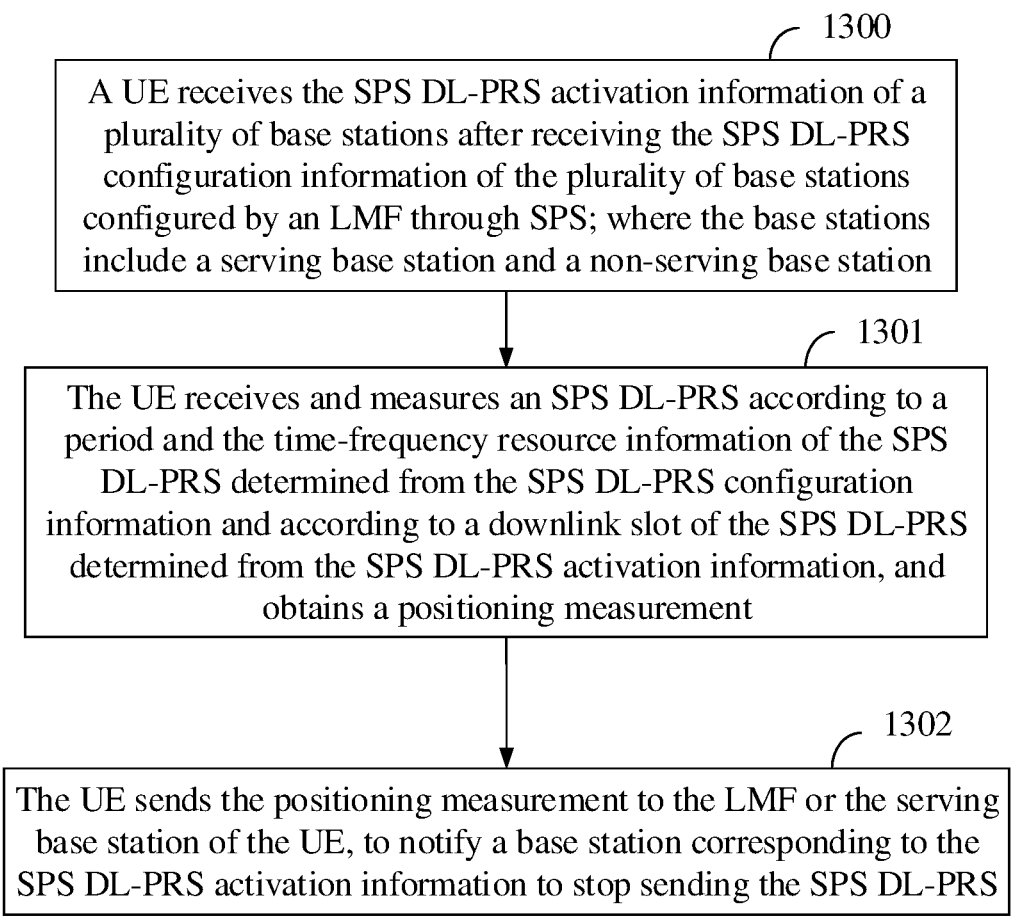
FIG. 13 is a flowchart of a method for receiving a downlink positioning reference signal according to an embodiment of the application.

Embodiment 10: based on the same inventive concept, this embodiment of the application further provides a method for receiving a downlink positioning reference signal, as shown in FIG. 13, including the following steps.

Step 1300: a UE receives the SPS DL-PRS activation information of a plurality of base stations after receiving the SPS DL-PRS configuration information of the plurality of base stations configured by an LMF through SPS; where the base stations include a serving base station and a non-serving base station.

Step 1301: the UE receives and measures an SPS DL-PRS according to a period and the time-frequency resource information of the SPS DL-PRS determined from the SPS DL-PRS configuration information and according to a downlink slot of the SPS DL-PRS determined from the SPS DL-PRS activation information, and obtains a positioning measurement.

Step 1302: the UE sends the positioning measurement to the LMF or the serving base station of the UE, to notify a base station corresponding to the SPS DL-PRS activation information to stop sending the SPS DL-PRS.

The method provided in this embodiment can activate the SPS DL-PRS of the serving base station and the non-serving base station (the base station adjacent to the serving base station), so that the terminal positioning process can be completed with the relatively small overhead of the downlink positioning reference signal, reducing the positioning delay and the overhead of the downlink positioning reference signal, and improve the system spectrum efficiency.

As an optional embodiment, after the UE sends the positioning measurement to the LMF or the serving base station of the UE, the method further includes:
the UE stops receiving the SPS DL-PRS; or
the UE stops receiving an SPS DL-PRS corresponding to SPS DL-PRS deactivation information of at least one base station in response to receiving the SPS DL-PRS deactivation information.

The method provided in this embodiment of the application can also enable the UE to stop receiving the SPS DL-PRS, improving the current problem that the periodic DL-PRS is regularly sent so that the UE may still receive the DL-PRS for positioning measurement even when the positioning service is no longer needed.

As an optional embodiment, after the UE obtains the positioning measurement, the method further includes:
the UE sends SPS DL-PRS deactivation information of at least one base station, to notify the base station corresponding to the SPS DL-PRS deactivation information to stop sending the SPS DL-PRS.

The method provided in this embodiment of the application can also enable the base station to stop sending the SPS DL-PRS after receiving the SPS DL-PRS deactivation information, thus reducing the overhead of the positioning reference signal effectively.

As an optional embodiment, after the UE sends the positioning measurement to the LMF, the method further includes:
the UE sends the positioning measurement to the base station corresponding to the SPS DL-PRS activation information through the LMF; or
the step in which the UE sends the positioning measurement to the serving base station, includes:
the UE sends the positioning measurement to the serving base station, so that the serving base station stops sending the SPS DL-PRS based on the positioning measurement and notifies the non-serving base station to stop sending the SPS DL-PRS.

This embodiment of the application provides two ways to send the positioning measurement, the purpose of which is to notify the base station to stop sending the SPS DL-PRS through the LMF, or notify the serving base station to stop sending the SPS DL-PRS, and the serving base station notifies the non-serving base station to stop sending the SPS DL-PRS, thus reducing the overhead of positioning reference signals effectively.

As an optional embodiment, before the UE receives the SPS DL-PRS configuration information of the base stations from the LMF by the SPS configuration, the method further includes:
the UE sends a positioning QoS indicator of the UE to the LMF, to notify the LMF to determine the SPS DL-PRS configuration information corresponding to the positioning QoS indicator according to the positioning QoS indicator.

The SPS DL-PRS configuration information provided in this embodiment of the application is determined based on the positioning QoS indicator, and different SPS DL-PRS configuration information is determined for the positioning QoS indicators of different UEs, so as to provide different UEs with the SPS DL-PRS configuration information more accurately, thereby ensuring the accuracy of UE positioning to a certain extent.

As an optional embodiment, the step in which the UE receives the SPS DL-PRS configuration information of the plurality of base stations from the LMF by the SPS configuration, includes:
  the UE receives the SPS DL-PRS configuration information of the plurality of base stations from the LMF by the SPS configuration via LLP signaling or RRC signaling; and/or
  the receiving the SPS DL-PRS activation information of the plurality of base stations, includes:
  the UE receives the SPS DL-PRS activation information of the plurality of base stations through DCI signaling or MAC-CE signaling.

In this embodiment of the application, the signalings used to transmit the SPS DL-PRS configuration information and the SPS DL-PRS activation information are different, which can effectively ensure the efficiency and accuracy of transmission.

As an optional embodiment, the step in which the UE receives the SPS DL-PRS activation information of the plurality of base stations, includes:
  the UE determines activation information according to an activation field in the DCI signaling after determining that the activation information is the SPS DL-PRS activation information according to a newly added field in the received DCI signaling.

The method for determining the SPS DL-PRS activation information provided in this embodiment of the application may be to determine according to the newly added field based on the existing SPS activation field, which can save transmission resources.

As an optional embodiment, the SPS DL-PRS activation information includes: first SPS DL-PRS activation information of the serving base station and second SPS DL-PRS activation information of the non-serving base station;
  the step in which the UE receives the SPS DL-PRS activation information of the plurality of base stations, includes:
  the UE determines the first SPS DL-PRS activation information according to a first field in a received signaling and the second SPS DL-PRS activation information according to a second field in the signaling; or
  the UE determines the first SPS DL-PRS activation information through a field in a received first signaling after determining the corresponding serving base station according to an index indication field in the first signaling; and the UE determines the second SPS DL-PRS activation information through a field in a received second signaling after determining the corresponding non-serving base station according to an index indication field in the second signaling.

In this embodiment of the application, the SPS DL-PRS activation information can also be determined through the newly defined field, so that more information can be carried, facilitating more information to be carried in the activation information later, and improving the positioning accuracy.

Figure 14:
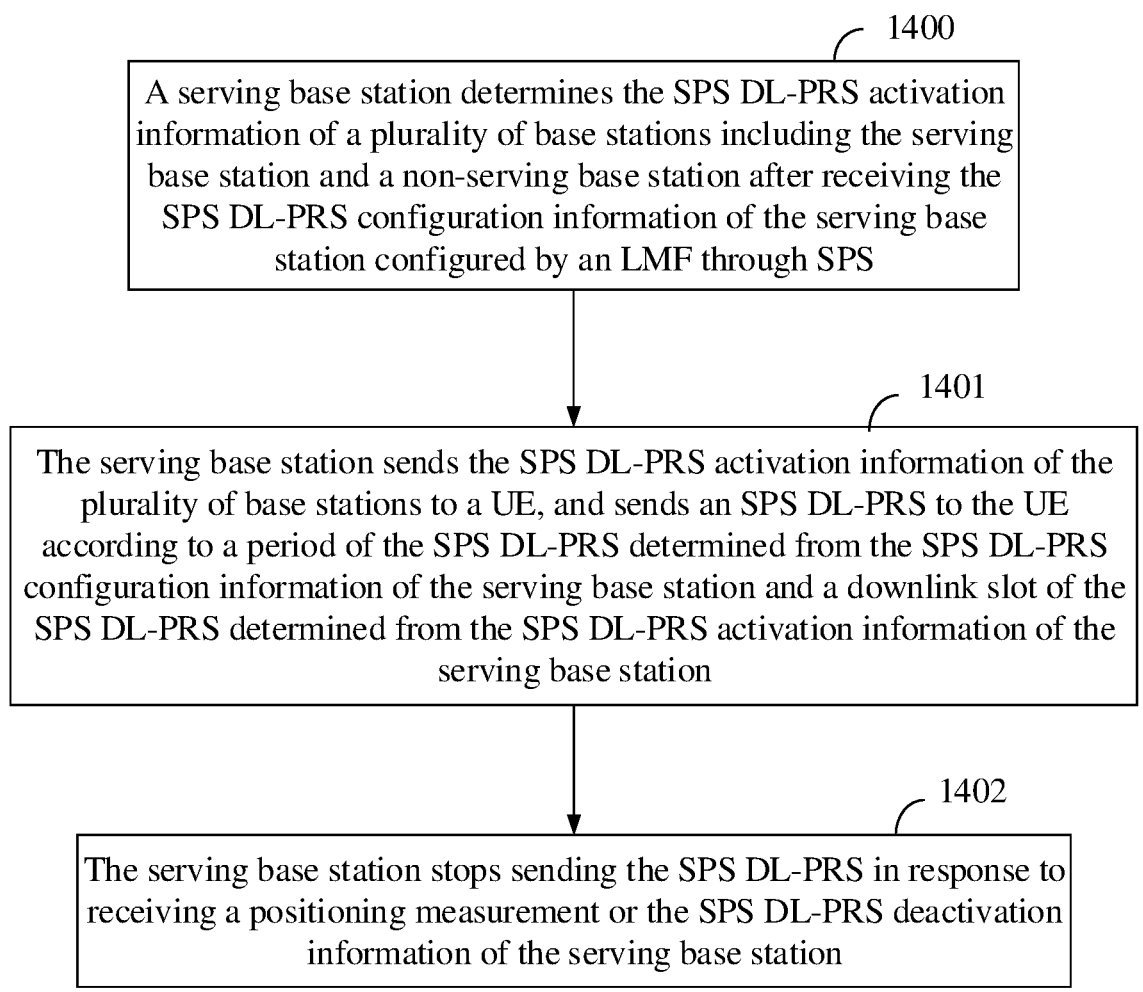
FIG. 14 is a flowchart of a method for sending a downlink positioning reference signal according to an embodiment of the application.

Embodiment 11: based on the same inventive concept, this embodiment of the application further provides a method for sending a downlink positioning reference signal, as shown in FIG. 14, including the following steps.

Step 1400: a serving base station determines the SPS DL-PRS activation information of a plurality of base stations including the serving base station and a non-serving base station after receiving the SPS DL-PRS configuration information of the serving base station configured by an LMF through SPS.

Step 1401: the serving base station sends the SPS DL-PRS activation information of the plurality of base stations to a UE, and sends an SPS DL-PRS to the UE according to a period of the SPS DL-PRS determined from the SPS DL-PRS configuration information of the serving base station and a downlink slot of the SPS DL-PRS determined from the SPS DL-PRS activation information of the serving base station.

Step 1402: the serving base station stops sending the SPS DL-PRS in response to receiving a positioning measurement or the SPS DL-PRS deactivation information of the serving base station.

As an optional embodiment, the SPS DL-PRS activation information includes: first SPS DL-PRS activation information of the serving base station and second SPS DL-PRS activation information of the non-serving base station;
  the step in which the serving base station determines the SPS DL-PRS activation information of the plurality of base stations including the serving base station, includes:
  the serving base station receives the first SPS DL-PRS activation information through the LMF, or determines the first SPS DL-PRS activation information by itself;
  the serving base station receives the second SPS DL-PRS activation information through the LMF or an Xn interface between base stations.

As an optional embodiment, the step in which the serving base station receives the SPS DL-PRS configuration information of the serving base station from the LMF by the SPS configuration, includes:
  the serving base station receives the SPS DL-PRS configuration information of the serving base station from the LMF by the SPS configuration via LLP signaling or RRC signaling; and/or
  the step in which the serving base station sends the SPS DL-PRS activation information of the plurality of base stations to the UE, includes:
  the serving base station sends the SPS DL-PRS activation information of the plurality of base stations through DCI signaling or MAC-CE signaling.

As an optional embodiment, the step in which the serving base station sends the SPS DL-PRS activation information of the plurality of base stations to the UE, includes:
  the serving base station determines activation information according to an activation field in the DCI signaling after determining that the activation information is the SPS DL-PRS activation information according to a newly added field in the sent DCI signaling.

As an optional embodiment, the SPS DL-PRS activation information includes: first SPS DL-PRS activation information of the serving base station and second SPS DL-PRS activation information of the non-serving base station;
  the step in which the serving base station sends the SPS DL-PRS activation information of the plurality of base stations to the UE, includes:
  the serving base station determines the first SPS DL-PRS activation information according to a first field in a sent signaling and the second SPS DL-PRS activation information according to a second field in the signaling; or the serving base station determines the first SPS DL-PRS activation information through a field in a sent first signaling after determining the corresponding serving base station according to an index indication field in the first signaling; and determines the second SPS DL-PRS activation information through a field in a sent second signaling after determining the corresponding non-serving base station according to an index indication field in the second signaling.

As an optional embodiment, the method further includes: the serving base station notifies the non-serving base station to stop sending an SPS DL-PRS, or sends SPS DL-PRS deactivation information of the non-serving base station to the UE, after receiving the SPS DL-PRS deactivation information of the non-serving base station.

As an optional embodiment, after the serving base station receives the positioning measurement or the SPS DL-PRS deactivation information of the serving base station, the method further includes:
 the serving base station sends the SPS DL-PRS deactivation information of the serving base station to the UE.

As an optional embodiment, the step in which the serving base station sends the SPS DL-PRS deactivation information of the non-serving base station to the UE, includes:
 the serving base station sends the SPS DL-PRS deactivation information of the non-serving base station to the UE through DCI signaling or MAC CE signaling; and/or
 the step in which the serving base station sends the SPS DL-PRS deactivation information of the serving base station to the UE, includes:
 the serving base station sends the SPS DL-PRS deactivation information of the serving base station to the UE through DCI signaling or MAC CE signaling.

Figure 15:
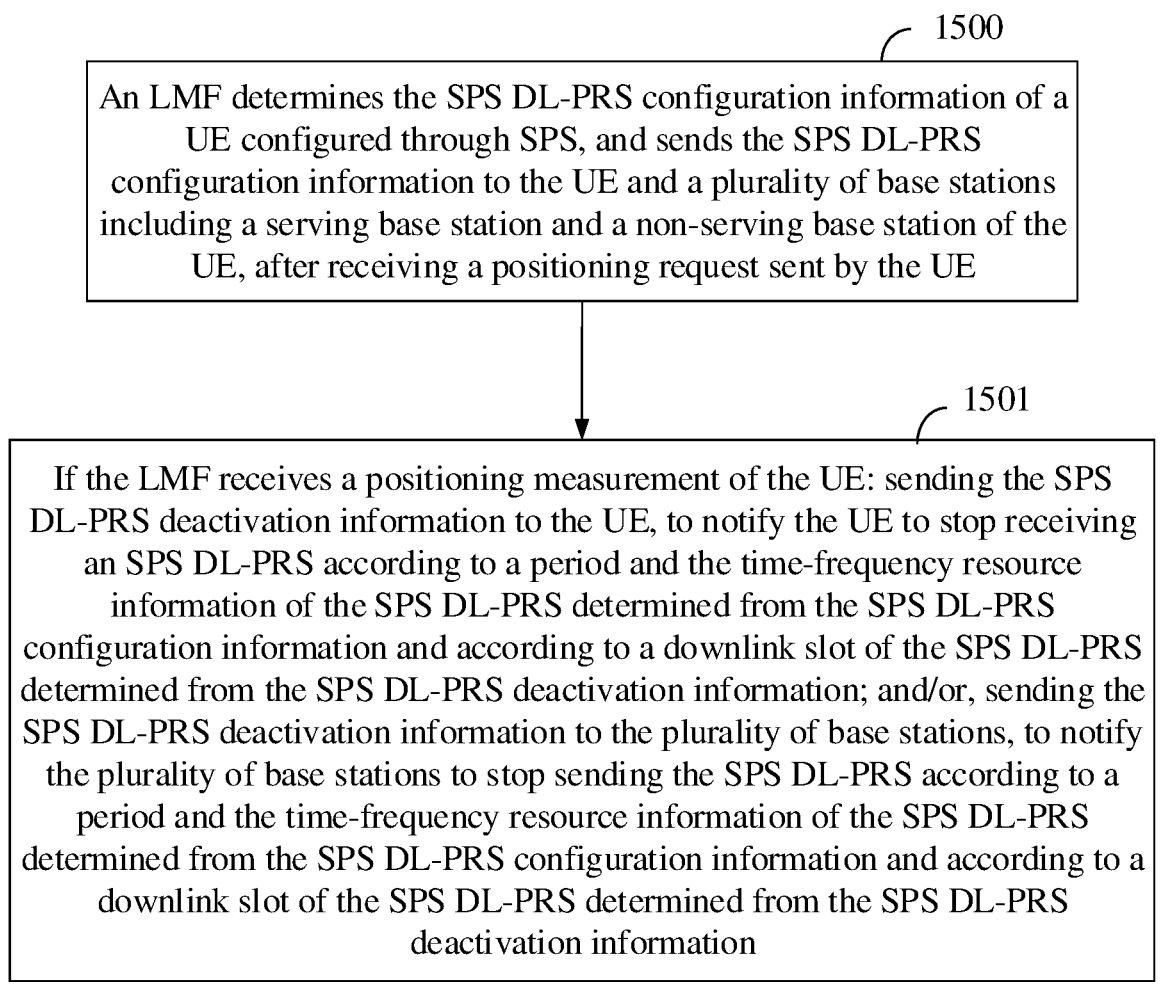
FIG. 15 is a flowchart of a method for sending a downlink positioning reference signal according to an embodiment of the application.

Embodiment 12: based on the same inventive concept, this embodiment of the application further provides a method for sending a downlink positioning reference signal, as shown in FIG. 15, including the following steps.

Step 1500: an LMF determines the SPS DL-PRS configuration information of a UE configured through SPS, and sends the SPS DL-PRS configuration information to the UE and a plurality of base stations including a serving base station and a non-serving base station of the UE, after receiving a positioning request sent by the UE.

Step 1501: if the LMF receives a positioning measurement of the UE: sending the SPS DL-PRS deactivation information to the UE, to notify the UE to stop receiving an SPS DL-PRS according to a period and the time-frequency resource information of the SPS DL-PRS determined from the SPS DL-PRS configuration information and according to a downlink slot of the SPS DL-PRS determined from the SPS DL-PRS deactivation information; and/or, sending the SPS DL-PRS deactivation information to the plurality of base stations, to notify the plurality of base stations to stop sending the SPS DL-PRS according to a period and the time-frequency resource information of the SPS DL-PRS determined from the SPS DL-PRS configuration information and according to a downlink slot of the SPS DL-PRS determined from the SPS DL-PRS deactivation information.

As an optional embodiment, the step in which the LMF determines the SPS DL-PRS configuration information of the UE by SPS configuration after receiving the positioning request sent by the UE, includes:
 the LMF determines the SPS DL-PRS configuration information corresponding to a positioning QoS indicator according to a mapping relationship between the positioning QoS indicator and the SPS DL-PRS configuration information after receiving the positioning request carrying the positioning QoS indicator sent by the UE.

As an optional embodiment, after the LMF sends the SPS DL-PRS configuration information to the plurality of base stations including the serving base station of the UE, the method further includes:
 the LMF determines the SPS DL-PRS activation information of at least one base station, and sends the SPS DL-PRS activation information to the serving base station; and/or
 the LMF sends the SPS DL-PRS activation information of at least one non-serving base station to the serving base station after receiving the SPS DL-PRS activation information.

As an optional embodiment, the method further includes:
 the LMF sends the SPS DL-PRS deactivation information of at least one base station to the at least one base station in response to receiving the SPS DL-PRS deactivation information sent by the UE.

Figure 16:
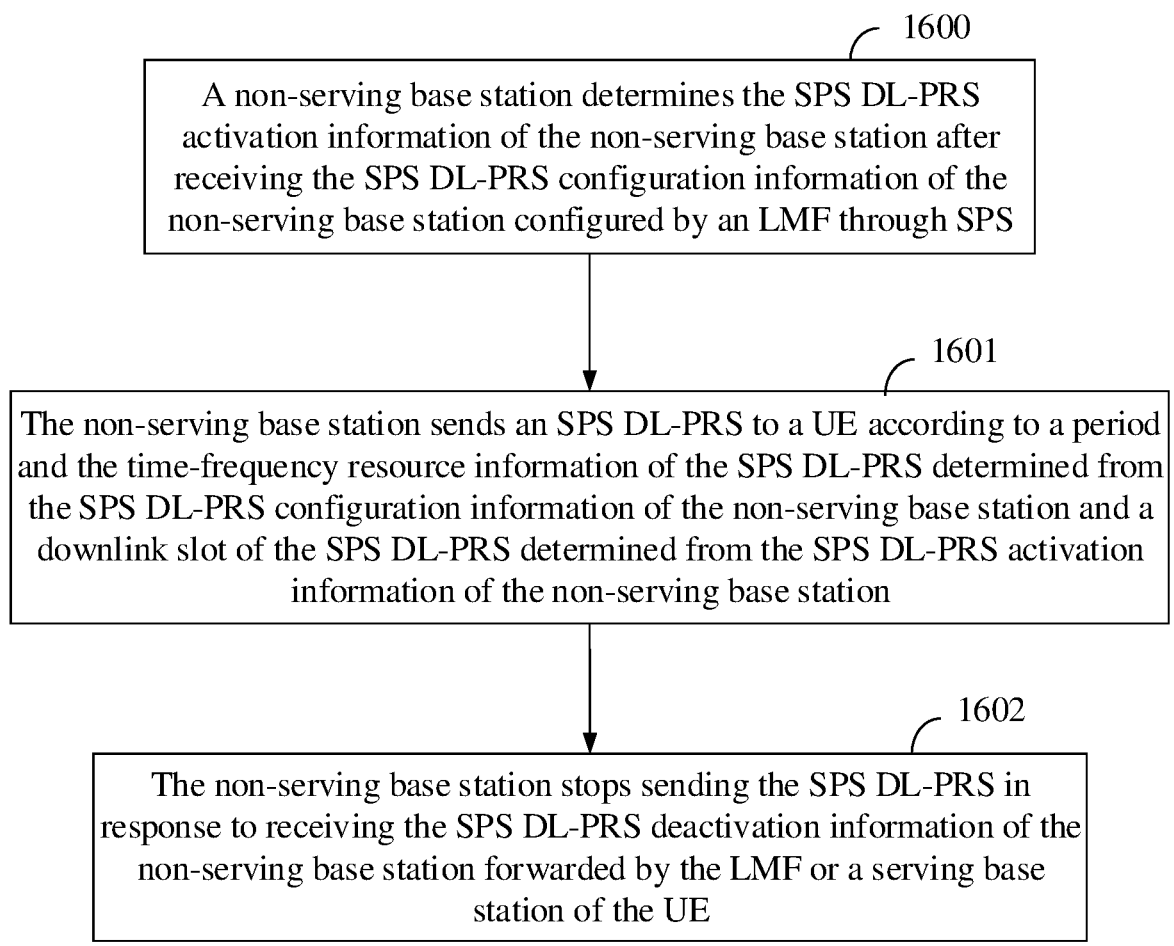
FIG. 16 is a flowchart of a method for sending a downlink positioning reference signal according to an embodiment of the application.

Embodiment 13: based on the same inventive concept, this embodiment of the application further provides a method for sending a downlink positioning reference signal, as shown in FIG. 16, including the following steps.

Step 1600: a non-serving base station determines the SPS DL-PRS activation information of the non-serving base station after receiving the SPS DL-PRS configuration information of the non-serving base station configured by an LMF through SPS.

Step 1601: the non-serving base station sends an SPS DL-PRS to a UE according to a period and the time-frequency resource information of the SPS DL-PRS determined from the SPS DL-PRS configuration information of the non-serving base station and a downlink slot of the SPS DL-PRS determined from the SPS DL-PRS activation information of the non-serving base station.

Step 1602: the non-serving base station stops sending the SPS DL-PRS in response to receiving the SPS DL-PRS deactivation information of the non-serving base station forwarded by the LMF or a serving base station of the UE.

As an optional embodiment, the step in which the non-serving base station determines the SPS DL-PRS activation information of the non-serving base station, includes:
 the non-serving base station receives the SPS DL-PRS activation information through the LMF, or determines the SPS DL-PRS activation information by itself.

As an optional embodiment, after the non-serving base station determines the SPS DL-PRS activation information of the non-serving base station, the method further includes:
 the non-serving base station sends the SPS DL-PRS activation information to the serving base station through the LMF or an Xn interface between base stations.

An embodiment further provides a processor storage medium, which may be any available media or data storage device accessible to the processor, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

An embodiment further provides a computer storage medium, where the program, when executed by a processor, implements the steps of the following method:

a UE receives the SPS DL-PRS activation information of a plurality of base stations after receiving the SPS DL-PRS configuration information of the plurality of base stations configured by an LMF through SPS; wherein the base stations include a serving base station and a non-serving base station;

the UE receives and measures an SPS DL-PRS according to a period and the time-frequency resource information of the SPS DL-PRS determined from the SPS DL-PRS configuration information and according to a downlink slot of the SPS DL-PRS determined from the SPS DL-PRS activation information, and obtains a positioning measurement;

the UE sends the positioning measurement to the LMF or the serving base station of the UE, to notify a base station corresponding to the SPS DL-PRS activation information to stop sending the SPS DL-PRS.

An embodiment further provides a processor storage medium, which may be any available media or data storage device accessible to the processor, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

An embodiment further provides a computer storage medium, where the program, when executed by a processor, implements the steps of the following method:

a serving base station determines the SPS DL-PRS activation information of a plurality of base stations including the serving base station and a non-serving base station after receiving the SPS DL-PRS configuration information of the serving base station configured by an LMF through SPS;

the serving base station sends the SPS DL-PRS activation information of the plurality of base stations to a UE, and sends an SPS DL-PRS to the UE according to a period of the SPS DL-PRS determined from the SPS DL-PRS configuration information of the serving base station and a downlink slot of the SPS DL-PRS determined from SPS DL-PRS activation information of the serving base station;

the serving base station stops sending the SPS DL-PRS in response to receiving a positioning measurement or the SPS DL-PRS deactivation information of the serving base station.

An embodiment further provides a processor storage medium, which may be any available media or data storage device accessible to the processor, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

An embodiment further provides a computer storage medium, where the program, when executed by a processor, implements the steps of the following method:

an LMF determines the SPS DL-PRS configuration information of a UE configured through SPS, and sends the SPS DL-PRS configuration information to the UE and a plurality of base stations including a serving base station and a non-serving base station of the UE, after receiving a positioning request sent by the UE;

if the LMF receives a positioning measurement of the UE: sending the SPS DL-PRS deactivation information to the UE, to notify the UE to stop receiving an SPS DL-PRS; and/or, sending the SPS DL-PRS deactivation information to the plurality of base stations, to notify the plurality of base stations to stop sending the SPS DL-PRS.

An embodiment further provides a processor storage medium, which may be any available media or data storage device accessible to the processor, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

An embodiment further provides a computer storage medium, where the program, when executed by a processor, implements the steps of the following method:

a non-serving base station determines the SPS DL-PRS activation information of the non-serving base station after receiving the SPS DL-PRS configuration information of the non-serving base station configured by an LMF through SPS;

the non-serving base station sends an SPS DL-PRS to a UE according to a period and the time-frequency resource information of the SPS DL-PRS determined from the SPS DL-PRS configuration information of the non-serving base station and a downlink slot of the SPS DL-PRS determined from the SPS DL-PRS activation information of the non-serving base station;

the non-serving base station stops sending the SPS DL-PRS in response to receiving SPS DL-PRS deactivation information of the non-serving base station forwarded by the LMF or a serving base station of the UE.

The application has been described above by reference to the block diagrams and/or flow charts showing the methods, devices (systems) and/or computer program products according to the embodiments of the application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the application can also be implemented by the hardware and/or software (including the firmware, resident software, microcode and the like). Further, the application can adopt the form of computer program products on the computer usable or computer readable storage medium, which has the computer usable or computer readable program codes implemented in the medium, to be used by the instruction execution system or used in combination with the instruction execution system. In the context of the application, the computer usable or computer readable storage medium can be any medium, which can contain, store, communicate with, transmit or transfer the programs, to be used by the instruction execution system, apparatus or device, or used in combination with the instruction execution system, apparatus or device.

Evidently those skilled in the art can make various modifications and variations to the embodiments of the application without departing from the spirit and scope of the embodiments of the application. Thus the embodiments of the application are also intended to encompass these modifications and variations therein as long as these modifications and variations to the embodiments of the application come into the scope of the claims of the embodiments of the application and their equivalents.

What is claimed is:

1. A method for receiving a downlink positioning reference signal, comprising:
   in response to receiving Semi-Persistent Scheduling DownLink Positioning Reference Signal, SPS DL-PRS, configuration information of a plurality of base stations configured by a Location Management Function, LMF, via SPS, receiving, by a User Equipment, UE, SPS DL-PRS activation information of the plurality of base stations; wherein the plurality of base stations comprise a serving base station and a non-serving base station;
   receiving and measuring, by the UE, an SPS DL-PRS according to a period and time-frequency resource information of the SPS DL-PRS determined from the SPS DL-PRS configuration information and according to a downlink slot of the SPS DL-PRS determined from the SPS DL-PRS activation information, and obtaining a positioning measurement;
   sending, by the UE, the positioning measurement to the LMF;
   receiving, by the UE, SPS DL-PRS deactivation information from the LMF;
   wherein receiving, by the UE, the SPS DL-PRS configuration information of the plurality of base stations from the LMF by the SPS configuration, comprises:
   receiving, by the UE, the SPS DL-PRS configuration information of the plurality of base stations from the LMF by the SPS configuration via Location Protocol, LPP, signaling or Radio Resource Control, RRC, signaling; and/or
   receiving, by the UE, the SPS DL-PRS activation information of the plurality of base stations, comprises:
   receiving, by the UE, the SPS DL-PRS activation information of the plurality of base stations through Downlink Control Information, DCI, signaling or Media Access Control-Control Element, MAC-CE, signaling;
   wherein at least one of following cases is comprised:
   case 1:
   receiving, by the UE, the SPS DL-PRS activation information of the plurality of base stations, comprises:
   in response to determining that activation information is the SPS DL-PRS activation information according to a newly added field in the DCI signaling, determining, by the UE, the SPS DL-PRS activation information according to an activation field in the DCI signaling;
   or
   case 2:
   the SPS DL-PRS activation information comprises: first SPS DL-PRS activation information of the serving base station and second SPS DL-PRS activation information of the non-serving base station;
   receiving, by the UE, the SPS DL-PRS activation information of the plurality of base stations, comprises:
   determining, by the UE, the first SPS DL-PRS activation information according to a first field in a received signaling and the second SPS DL-PRS activation information according to a second field in the signaling;
   or
   in response to determining a corresponding serving base station according to an index indication field in a first signaling, determining, by the UE, the first SPS DL-PRS activation information according to a field in the first signaling; and
   in response to determining a corresponding non-serving base station according to an index indication field in a second signaling, determining, by the UE, the second SPS DL-PRS activation information according to a field in the second signaling.

2. The method according to claim 1, wherein, the method further comprises:
   stopping, by the UE, receiving the SPS DL-PRS.

3. The method according to claim 1, wherein, after the UE obtains the positioning measurement, the method further comprises:
   sending, by the UE, SPS DL-PRS deactivation information of at least one base station, wherein the SPS DL-PRS deactivation information is used to notify the base station corresponding to the SPS DL-PRS deactivation information to stop sending the SPS DL-PRS.

4. The method according to claim 1, wherein, after the UE sends the positioning measurement to the LMF, the method further comprises:
   sending, by the UE, the positioning measurement to the base station corresponding to the SPS DL-PRS activation information via the LMF.

5. The method according to claim 1, wherein, before the UE receives the SPS DL-PRS configuration information of the base stations from the LMF by the SPS configuration, the method further comprises:
   sending, by the UE, a positioning Quality of Service, QoS, indicator of the UE to the LMF, wherein the positioning QoS indicator is used to notify the LMF to determine the SPS DL-PRS configuration information corresponding to the positioning QoS indicator according to the positioning QoS indicator.

6. A method for sending a downlink positioning reference signal, comprising:
   in response to receiving Semi-Persistent Scheduling DownLink Positioning Reference Signal, SPS DL-PRS, configuration information of a serving base station configured by a Location Management Function, LMF, via SPS, determining, by the serving base station, SPS DL-PRS activation information of a plurality of base stations comprising the serving base station and a non-serving base station;
   sending, by the serving base station, the SPS DL-PRS activation information of the plurality of base stations to a UE, and sending an SPS DL-PRS to the UE according to a period of the SPS DL-PRS determined from the SPS DL-PRS configuration information of the serving base station and according to a downlink slot of the SPS DL-PRS determined from SPS DL-PRS activation information of the serving base station;
   stopping, by the serving base station, sending the SPS DL-PRS in response to receiving SPS DL-PRS deactivation information of the serving base station via the LMF;
   wherein the UE is configured to receive SPS DL-PRS configuration information of a plurality of base stations from the LMF by the SPS configuration via Location Protocol, LPP, signaling or Radio Resource Control, RRC, signaling; and/or
   the UE is configured to receive the SPS DL-PRS activation information of the plurality of base stations through Downlink Control Information, DCI, signaling or Media Access Control-Control Element, MAC-CE, signaling;

wherein the plurality of base stations comprise the serving base station and the non-serving base station;
wherein at least one of following cases is comprised:
case 1:
the UE is configured to receive the SPS DL-PRS activation information of the plurality of base stations by:
in response to determining that activation information is the SPS DL-PRS activation information according to a newly added field in the DCI signaling, determining the SPS DL-PRS activation information according to an activation field in the DCI signaling;
or
case 2:
the SPS DL-PRS activation information comprises: first SPS DL-PRS activation information of the serving base station and second SPS DL-PRS activation information of the non-serving base station;
the UE is configured to receive the SPS DL-PRS activation information of the plurality of base stations by:
determining the first SPS DL-PRS activation information according to a first field in a received signaling and the second SPS DL-PRS activation information according to a second field in the signaling;
or
in response to determining a corresponding serving base station according to an index indication field in a first signaling, determining the first SPS DL-PRS activation information according to a field in the first signaling; and
in response to determining a corresponding non-serving base station according to an index indication field in a second signaling, determining the second SPS DL-PRS activation information according to a field in the second signaling.

7. The method according to claim 6, wherein determining, by the serving base station, the SPS DL-PRS activation information of the plurality of base stations comprising the serving base station and the non-serving base station, comprises:
receiving, by the serving base station, the first SPS DL-PRS activation information via the LMF, or determining, by the serving base station, the first SPS DL-PRS activation information;
receiving, by the serving base station, the second SPS DL-PRS activation information via the LMF or an Xn interface between base stations.

8. The method according to claim 6, wherein receiving, by the serving base station, the SPS DL-PRS configuration information of the serving base station from the LMF by the SPS configuration, comprises:
receiving, by the serving base station, the SPS DL-PRS configuration information of the serving base station from the LMF by the SPS configuration via LPP signaling or RRC signaling; and/or
sending, by the serving base station, the SPS DL-PRS activation information of the plurality of base stations to the UE, comprises:
sending, by the serving base station, the SPS DL-PRS activation information of the plurality of base stations through DCI signaling or MAC-CE signaling;
wherein sending, by the serving base station, the SPS DL-PRS activation information of the plurality of base stations to the UE, comprises:
in response to determining that activation information is the SPS DL-PRS activation information according to a newly added field in the sent DCI signaling, determining, by the serving base station, the SPS DL-PRS activation information according to an activation field in the DCI signaling.

9. The method according to claim 6, wherein the SPS DL-PRS activation information comprises: first SPS DL-PRS activation information of the serving base station and second SPS DL-PRS activation information of the non-serving base station;
sending, by the serving base station, the SPS DL-PRS activation information of the plurality of base stations to the UE, comprises:
determining, by the serving base station, the first SPS DL-PRS activation information according to a first field in a signaling that is sent and the second SPS DL-PRS activation information according to a second field in the signaling;
or
in response to determining a corresponding serving base station according to an index indication field in a first signaling, determining, by the serving base station, the first SPS DL-PRS activation information through a field in the first signaling; and
in response to determining a corresponding non-serving base station according to an index indication field in a second signaling, determining, by the serving base station, the second SPS DL-PRS activation information through a field in the second signaling.

10. The method according to claim 6, further comprising:
in response to receiving SPS DL-PRS deactivation information of the non-serving base station, notifying, by the serving base station, the non-serving base station to stop sending an SPS DL-PRS, or sending, by the serving base station, the SPS DL-PRS deactivation information of the non-serving base station to the UE.

11. The method according to claim 6, wherein, after the serving base station receives the SPS DL-PRS deactivation information of the serving base station, the method further comprises:
sending, by the serving base station, the SPS DL-PRS deactivation information of the non-serving base station to the UE through DCI signaling or MAC CE signaling; and/or
sending, by the serving base station, the SPS DL-PRS deactivation information of the serving base station to the UE, comprises:
sending, by the serving base station, the SPS DL-PRS deactivation information of the serving base station to the UE through DCI signaling or MAC CE signaling.

12. An apparatus for transmitting a downlink positioning reference signal, comprising a memory, a transceiver and a processor:
the memory is configured to store a computer program;
the transceiver is configured to send and receive data under control of the processor; and
the processor is configured to read the computer program in the memory and perform steps of the method of claim 6.

13. A method for sending a downlink positioning reference signal, comprising:
in response to receiving a positioning request sent by a User Equipment, UE, determining, by a Location Management Function, LMF, Semi-Persistent Scheduling DownLink Positioning Reference Signal, SPS DL-PRS, configuration information of the UE configured via SPS, and sending the SPS DL-PRS configuration information to the UE and a plurality of base stations comprising a serving base station and a non-serving base station of the UE;

in response to receiving a positioning measurement from the UE: sending, by the LMF, SPS DL-PRS deactivation information to the UE, wherein the SPS DL-PRS deactivation information is used to notify the UE to stop receiving an SPS DL-PRS according to a period and time-frequency resource information of the SPS DL-PRS determined from the SPS DL-PRS configuration information and according to a downlink slot of the SPS DL-PRS determined from the SPS DL-PRS deactivation information; and/or, sending the SPS DL-PRS deactivation information to the plurality of base stations, wherein the SPS DL-PRS deactivation information is used to notify the plurality of base stations to stop sending the SPS DL-PRS according to a period and time-frequency resource information of the SPS DL-PRS determined from the SPS DL-PRS configuration information and according to a downlink slot of the SPS DL-PRS determined from the SPS DL-PRS deactivation information;

wherein the UE is configured to receive the SPS DL-PRS configuration information of the plurality of base stations from the LMF by the SPS configuration via Location Protocol, LPP, signaling or Radio Resource Control, RRC, signaling; and/or the UE is configured to receive the SPS DL-PRS activation information of the plurality of base stations through Downlink Control Information, DCI, signaling or Media Access Control-Control Element, MAC-CE, signaling;

wherein at least one of following cases is comprised:

case 1:

the UE is configured to receive the SPS DL-PRS activation information of the plurality of base stations by:

in response to determining that activation information is the SPS DL-PRS activation information according to a newly added field in the DCI signaling, determining the SPS DL-PRS activation information according to an activation field in the DCI signaling;

or case 2:

the SPS DL-PRS activation information comprises: first SPS DL-PRS activation information of the serving base station and second SPS DL-PRS activation information of the non-serving base station;

the UE is configured to receive the SPS DL-PRS activation information of the plurality of base stations by:

determining the first SPS DL-PRS activation information according to a first field in a received signaling and the second SPS DL-PRS activation information according to a second field in the signaling;

or in response to determining a corresponding serving base station according to an index indication field in a first signaling, determining the first SPS DL-PRS activation information according to a field in the first signaling; and in response to determining a corresponding non-serving base station according to an index indication field in a second signaling, determining the second SPS DL-PRS activation information according to a field in the second signaling.

14. The method according to claim 13, wherein in response to receiving the positioning request sent by the UE, determining, by the LMF, the SPS DL-PRS configuration information of the UE through SPS configuration, comprises:

in response to receiving the positioning request carrying a positioning Quality of Service, QoS, indicator sent by the UE, determining, by the LMF, the SPS DL-PRS configuration information corresponding to the positioning QOS indicator according to a mapping relationship between the positioning QoS indicator and the SPS DL-PRS configuration information.

15. The method according to claim 13, wherein, after the LMF sends the SPS DL-PRS configuration information to the plurality of base stations comprising the serving base station of the UE, the method further comprises:

determining, by the LMF, SPS DL-PRS activation information of at least one base station, and sending the SPS DL-PRS activation information of the at least one base station to the serving base station; and/or in response to receiving SPS DL-PRS activation information of at least one non-serving base station, sending, by the LMF, the SPS DL-PRS activation information of the at least one non-serving base station to the serving base station.

16. The method according to claim 13, further comprising:

in response to receiving SPS DL-PRS deactivation information of at least one base station sent from the UE, sending, by the LMF, the SPS DL-PRS deactivation information of the at least one base station to the at least one base station.

17. An apparatus for transmitting a downlink positioning reference signal, comprising a memory, a transceiver and a processor:

the memory is configured to store a computer program;
the transceiver is configured to send and receive data under control of the processor; and
the processor is configured to read the computer program in the memory and perform steps of the method of claim 13.

18. An apparatus for transmitting a downlink positioning reference signal, comprising a memory, a transceiver and a processor:

the memory is configured to store a computer program;
the transceiver is configured to send and receive data under control of the processor; and
the processor is configured to read the computer program in the memory and perform:

in response to receiving Semi-Persistent Scheduling DownLink Positioning Reference Signal, SPS DL-PRS, configuration information of a plurality of base stations configured by a Location Management Function, LMF, via SPS, receiving SPS DL-PRS activation information of the plurality of base stations; wherein the plurality of base stations comprise a serving base station and a non-serving base station;

receiving and measuring an SPS DL-PRS according to a period and time-frequency resource information of the SPS DL-PRS determined from the SPS DL-PRS configuration information and according to a downlink slot of the SPS DL-PRS determined from the SPS DL-PRS activation information, and obtaining a positioning measurement;

sending the positioning measurement to the LMF;
receiving SPS DL-PRS deactivation information from the LMF;

wherein receiving the SPS DL-PRS configuration information of the plurality of base stations from the LMF by the SPS configuration, comprises:
receiving the SPS DL-PRS configuration information of the plurality of base stations from the LMF by the SPS configuration via Location Protocol, LPP, signaling or Radio Resource Control, RRC, signaling; and/or
receiving the SPS DL-PRS activation information of the plurality of base stations, comprises:
receiving the SPS DL-PRS activation information of the plurality of base stations through Downlink Control Information, DCI, signaling or Media Access Control-Control Element, MAC-CE, signaling;
wherein at least one of following cases is comprised:
case 1:
receiving the SPS DL-PRS activation information of the plurality of base stations, comprises:
in response to determining that activation information is the SPS DL-PRS activation information according to a newly added field in the DCI signaling, determining the SPS DL-PRS activation information according to an activation field in the DCI signaling;
or
case 2:
the SPS DL-PRS activation information comprises: first SPS DL-PRS activation information of the serving base station and second SPS DL-PRS activation information of the non-serving base station;
receiving the SPS DL-PRS activation information of the plurality of base stations, comprises:
determining the first SPS DL-PRS activation information according to a first field in a received signaling and the second SPS DL-PRS activation information according to a second field in the signaling;
or
in response to determining a corresponding serving base station according to an index indication field in a first signaling, determining the first SPS DL-PRS activation information according to a field in the first signaling; and
in response to determining a corresponding non-serving base station according to an index indication field in a second signaling, determining the second SPS DL-PRS activation information according to a field in the second signaling.

* * * * *